United States Patent
Fukuda

(10) Patent No.: US 8,823,696 B2
(45) Date of Patent: Sep. 2, 2014

(54) INFORMATION PROCESSING APPARATUS, AND SIGNAL TRANSMISSION METHOD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 12/852,586

(22) Filed: Aug. 9, 2010

(65) Prior Publication Data

US 2011/0037759 A1 Feb. 17, 2011

(30) Foreign Application Priority Data

Aug. 17, 2009 (JP) ................................. 2009-188574

(51) Int. Cl.
*G06F 3/038* (2013.01)
*G09G 5/00* (2006.01)

(52) U.S. Cl.
CPC ............ *G09G 5/006* (2013.01); *G09G 2330/06* (2013.01); *G09G 2330/021* (2013.01)
USPC ............ 345/213; 345/2.1; 345/643; 375/257; 375/354

(58) Field of Classification Search
USPC ........... 345/211–213; 348/790; 375/286–294; 455/575.1, 575.3; 370/522, 527, 529
See application file for complete search history.

(56) References Cited

U.S. PATENT DOCUMENTS

| | | | |
|---|---|---|---|
| 7,257,430 B2 * | 8/2007 | Lenchik et al. | 455/575.3 |
| 8,223,041 B2 * | 7/2012 | Sugita | 341/55 |
| 2005/0162338 A1 * | 7/2005 | Ikeda et al. | 345/2.1 |
| 2008/0260049 A1 * | 10/2008 | Wood | 375/257 |
| 2009/0323828 A1 * | 12/2009 | Sugita et al. | 375/257 |
| 2010/0027728 A1 * | 2/2010 | Sugita et al. | 375/354 |

FOREIGN PATENT DOCUMENTS

JP 03-109843 5/1991

* cited by examiner

*Primary Examiner* — Gerald Johnson
(74) *Attorney, Agent, or Firm* — Wolf, Greenfield & Sacks, P.C.

(57) ABSTRACT

Provided is an information processing apparatus which includes a first module including a signal addition unit that generates an addition signal by adding a data signal to a clock, a signal subtraction unit that generates a subtraction signal by subtracting the data signal from the clock, a first signal transmission unit that transmits the addition signal through a first transmission line, and a second signal transmission unit that transmits the subtraction signal through a second transmission line, and a second module including a data component extraction unit that extracts a component of the data signal by subtracting the subtraction signal received through the second transmission line from the addition signal received through the first transmission line, and a clock component extraction unit that extracts a component of the clock by adding the subtraction signal received through the second transmission line to the addition signal received through the first transmission line.

22 Claims, 11 Drawing Sheets

INFORMATION PROCESSING APPARATUS, AND SIGNAL TRANSMISSION METHOD

BACKGROUND OF THE INVENTION

1. Field of the Invention

The present invention relates to an information processing apparatus, and a signal transmission method.

2. Description of the Related Art

Most information processing apparatuses such as mobile phone and notebook personal computer (hereinafter, a notebook PC) use a movable member for a hinge portion connecting a main body to be operated by a user and a display portion on which information is displayed. However, a large number of signal lines and a power line pass through the hinge portion. Accordingly, from a standpoint of maintaining reliability of the wiring, a method of reducing the number of signal lines passing through the hinge portion as much as possible is desired. For this reason, it is deemed preferable nowadays to use a serial transmission scheme that is capable of reducing the number of signal lines, instead of a parallel transmission scheme, for data transmission performed between the main body and the display portion. Additionally, JP-A-1991-109843 discloses a technology for encoding serial data into an AMI (Alternate Mark Inversion) code and transmitting the same by the serial transmission scheme.

SUMMARY OF THE INVENTION

Furthermore, electronic devices these days offer extremely wide range of functions, and a method is desired of further increasing the movable range of the hinge portion such that an electronic device can be transformed, according to a function to be used, into a shape that a user finds easy to use. For example, mobile phones these days are loaded, in addition to basic communication function and mail function, with various functions such as a camera function, a television function, and the like. In case of using the television function, a compact shape with the main body that is rarely operated at the time of watching TV folded behind the display portion is desirable such that a user can easily hold the housing. A very complicated movement is desired of the hinge portion to achieve such shape.

Ordinarily, transmission/reception of display data, control data and the like is performed between the main body and the display portion. Furthermore, in case a sensor, a switch and the like are provided in the display portion, signals output from these devices are transmitted to the main body. Furthermore, each device provided in the display portion is driven by the power supplied from the main body. Accordingly, even when the serial transmission scheme is adopted, a plurality of signal lines and a power line will still be wired in the hinge portion.

Furthermore, in a case of an electronic device provided with a high-resolution display device in the display portion, display data has to be transmitted from the main body to the display portion at a high speed, and the clock frequency of a signal that is serially transmitted from the main body to the display portion will be extremely high. As a result, electromagnetic interference (EMI) to the radio wave of a mobile phone or the like is caused by the signal that is serially transmitted. Furthermore, if the number of signal lines increase, it will result in additional cost relating to cables and connectors. Furthermore, the increase in the mounting area will hinder the miniaturization of the electronic device.

For these reasons, a technology for efficiently transmitting data with as few signal lines (transmission lines) as possible is desired. Additionally, an explanation has been given here with a mobile phone as an example, but similar issues are also present for a notebook PC and various electronic devices in addition to the mobile phone. The present invention has been devised in view of such issues, and the present invention aims to provide an information processing apparatus and a signal transmission method which are new and improved, and which are capable of efficiently transmitting data by using two transmission lines.

According to an embodiment of the present invention, there is provided an information processing apparatus which includes a first module including a signal addition unit that generates an addition signal by adding a data signal to a clock, a signal subtraction unit that generates a subtraction signal by subtracting the data signal from the clock, a first signal transmission unit that transmits the addition signal through a first transmission line, and a second signal transmission unit that transmits the subtraction signal through a second transmission line, and a second module including a data component extraction unit that extracts a component of the data signal by subtracting the subtraction signal received through the second transmission line from the addition signal received through the first transmission line, and a clock component extraction unit that extracts a component of the clock by adding the subtraction signal received through the second transmission line to the addition signal received through the first transmission line.

The first module may further include a power superimposition unit that superimposes DC power on the addition signal generated at the signal addition unit and on the subtraction signal generated at the signal subtraction unit. The first signal transmission unit may transmit, through the first transmission line, the addition signal on which the DC power has been superimposed at the power superimposition unit. The second signal transmission unit may transmit, through the second transmission line, the subtraction signal on which the DC power has been superimposed at the power superimposition unit. The second module may further include a power separation unit that separates the DC power and the addition signal from a signal received through the first transmission line, and separate the DC power and the subtraction signal from a signal received through the second transmission line.

The second module may further include a low-cut filter that removes a low-frequency component from the component of the clock extracted at the clock component extraction unit.

The first module may further include a data encoding unit that generates the data signal by encoding data into a code not having a DC component.

The first module may further include a synchronous addition unit that generates a clock-added signal by synchronously adding the clock to a first data signal. The signal addition unit may generate an addition signal by adding a second data signal to the clock-added signal generated at the synchronous addition unit. The signal subtraction unit may generate a subtraction signal by subtracting the second data signal from the clock-added signal generated at the synchronous addition unit. The data component extraction unit may extract a component of the second data signal by subtracting the subtraction signal received through the second transmission line from the addition signal received through the first transmission line. The clock component extraction unit may extract a component of the clock-added signal by adding the subtraction signal received through the second transmission line to the addition signal received through the first transmission line, and also, may extract a component of the clock based on a polarity inversion cycle of the component of such clock-added signal.

The second module may further include a third signal transmission unit that transmits a data signal through the first transmission line, and a fourth signal transmission unit that transmits the data signal through the second transmission line. In case the data signal is to be transmitted by the third and fourth signal transmission units, the first signal transmission unit may transmit the clock through the first transmission line, and the second signal transmission unit may transmit an inverted signal of the clock through the second transmission line. The first module may further include a data component extraction unit that extracts a component of the data signal by adding a signal received through the second transmission line to a signal received through the first transmission line.

The second module may further include a data encoding unit that generates the data signal by encoding data into a code not having a DC component.

The signal addition unit may add the data signal to the clock in a digital domain. The signal subtraction unit may subtract the data signal from the clock in a digital domain.

The signal addition unit may add the data signal to the clock in an analogue domain. The signal subtraction unit may subtract the data signal from the clock in an analogue domain.

The first and second transmission lines may be formed from two coaxial cables, one 2-core coaxial cable, or one shielded 2-core flexible cable.

The first module may further include an arithmetic processing unit that outputs at least display data. The second module may further include a display unit that displays the display data that is input. The signal addition unit may generate an addition signal by adding a data signal of the display data output from the arithmetic processing unit to the clock. The signal subtraction unit may generate a subtraction signal by subtracting the data signal of the display data output from the arithmetic processing unit from the clock. The data component extraction unit may extract a component of the data signal of the display data, and may input the display data regenerated from the component of the data signal to the display unit.

According to another embodiment of the present invention, there is provided an information processing apparatus which includes a first module including a signal addition unit that generates an addition signal by adding a second data signal to a first data signal, a signal subtraction unit that generates a subtraction signal by subtracting the second data signal from the first data signal, a first signal transmission unit that transmits the addition signal through a first transmission line, and a second signal transmission unit that transmits the subtraction signal through a second transmission line, and a second module including a first data component extraction unit that extracts a component of the first data signal by subtracting the subtraction signal received through the second transmission line from the addition signal received through the first transmission line, and a second data component extraction unit that extracts a component of the second data signal by adding the subtraction signal received through the second transmission line to the addition signal received through the first transmission line.

According to another embodiment of the present invention, there is provided a signal transmission method including the steps of generating an addition signal by adding a data signal to a clock, generating a subtraction signal by subtracting the data signal from the clock, transmitting the addition signal through a first transmission line, transmitting the subtraction signal through a second transmission line, receiving, through the first and second transmission lines, the addition signal and the subtraction signal transmitted in the step of transmitting the addition signal and of transmitting the subtraction signal, extracting a component of the data signal by subtracting the subtraction signal received through the second transmission line from the addition signal received through the first transmission line, and extracting a component of the clock by adding the subtraction signal received through the second transmission line to the addition signal received through the first transmission line.

According to another embodiment of the present invention, there is provided a signal transmission method including the steps of generating an addition signal by adding a second data signal to a first data signal, generating a subtraction signal by subtracting the second data signal from the first data signal, transmitting the addition signal through a first transmission line, transmitting the subtraction signal through a second transmission line, receiving, through the first and second transmission lines, the addition signal and the subtraction signal transmitted in the step of transmitting the addition signal and of transmitting the subtraction signal, extracting a component of the first data signal by subtracting the subtraction signal received through the second transmission line from the addition signal received through the first transmission line, and extracting a component of the second data signal by adding the subtraction signal received through the second transmission line to the addition signal received through the first transmission line.

According to the embodiments of the present invention described above, it is possible to efficiently transmit data by using two transmission lines.

DETAILED DESCRIPTION OF THE EMBODIMENT(S)

Figure 1:
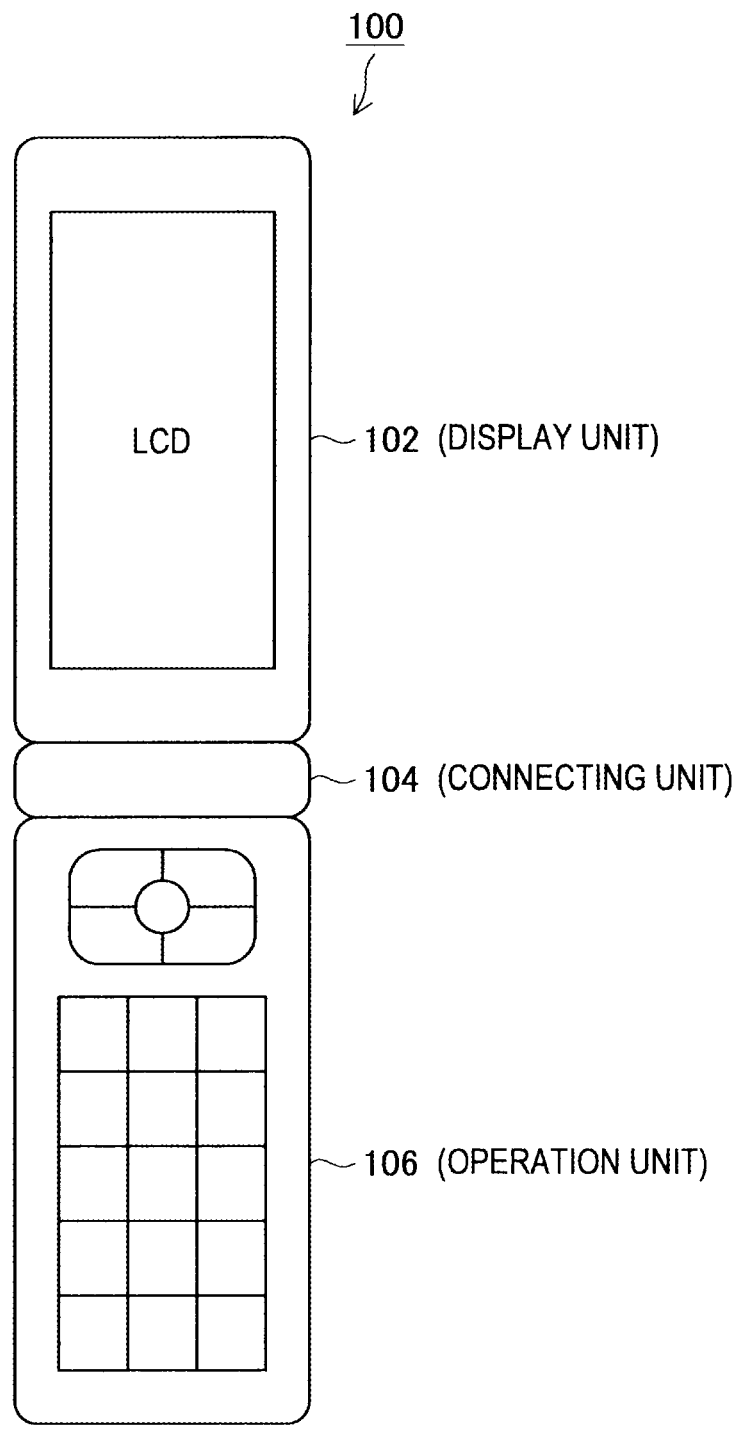
FIG. 1 is an explanatory diagram showing an example of a device configuration of a mobile terminal according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of an embodiment of the present invention to be described below will be briefly mentioned here. First, a device configuration of a mobile terminal 100 assumed in the first embodiment of the present invention will be described with reference to FIG. 1. Then, the functional configuration of a mobile terminal 10 according to a parallel transmission scheme will be briefly described with reference to FIG. 2. Then, the functional configuration of the mobile terminal 100 according to the first embodiment of the present invention will be described with reference to FIG. 3. Then, a detailed configuration of the mobile terminal 100 according to the first embodiment of the present invention will be described with reference to FIG. 4.

Next, a signal transmission method according to the first embodiment of the present invention will be described with reference to FIGS. 5 to 8. Here, transmission characteristics of a signal transmitted by this signal transmission method will also be briefly described with reference to FIG. 10. Then, a modified example of the first embodiment of the present invention will be described with reference to FIG. 9. Then, the configuration of a mobile terminal 300 according to the second embodiment of the present invention will be described with reference to FIG. 11. Lastly, the technical idea of the first embodiment of the present invention will be summarized and effects obtained by the technical idea will be briefly described.

DESCRIPTION ITEMS

1: First Embodiment
  1-1: Structure of Mobile Terminal 100
  1-2: Functional Configuration of Mobile Terminal 100
    1-2-1: Configuration of SERDES (Forward)
    1-2-2: Configuration of SERDES (Reverse)
  1-3: Signal Transmission Method
    1-3-1: AMI Code+⅛ CLK
    1-3-2: AMI Code+½ CLK
    1-3-3: AMI Code+Manchester Code
    1-3-4: AMI Code+Multilevel Code (Manchester Code+ ⅛ CLK)
  1-4: (Modified Example) Analogue Addition Scheme
2: Second Embodiment
  2-1: Functional Configuration of Mobile Terminal 300
3: Summary

1: First Embodiment

The first embodiment of the present invention will be described. The present embodiment proposes a method of efficiently transmitting data by using two coaxial cables. Additionally, one 2-core coaxial cable or a shielded 2-core flexible cable may be used instead of two coaxial cables. However, in the following description, a case where two coaxial cables are used will be described as an example for the sake of explanation.

1-1: Structure of Mobile Terminal 100

First, the structure of a mobile terminal 100 assumed in the present embodiment will be briefly described with reference to FIG. 1. FIG. 1 is an explanatory diagram showing the structure of the mobile terminal 100 assumed in the present embodiment. In this specification, a folding mobile phone is assumed for the sake of explanation, but the application range of the technology according to the present embodiment is not limited to such. For example, the technology according to the present embodiment can be applied to a notebook PC, a portable information terminal, a portable game machine, or any other electronic device having a hinge portion.

Now, the external form of the mobile terminal 100 assumed in the present embodiment is shown in FIG. 1. As shown in FIG. 1, the mobile terminal 100 is mainly configured from a display unit 102, a connecting unit 104, and an operation unit 106.

The display unit 102 is provided with an LCD (Liquid Crystal Display), an ELD (Electro Luminescence Display) or the like, for example. In the following, a description will be made assuming that an LCD is provided to the display unit 102. Furthermore, it is assumed that the display unit 102 is connected to the operation unit 106 via the connecting unit 104. The connecting unit 104 is configured from a movable member. Accordingly, a user can change the relative positional relationship between the display unit 102 and the operation unit 106 within the transformable range of the connecting unit 104.

Furthermore, operation keys are provided on the operation unit 106, for example. Furthermore, a CPU (Central Processing Unit) and a battery are provided within the operation unit 106. A part of data output from the CPU is transmitted from the operation unit 106 to the display unit 102. For example, display data is transmitted from the operation unit 106 to the display unit 102, and is input to the LCD provided to the display unit 102. Also, an electric current output from the battery is supplied from the operation unit 106 to the display unit 102 as power for the display unit 102.

As described, data and power are transmitted from the operation unit 106 to the display unit 102. Furthermore, in many cases, various devices, such as a camera, a sensor, a switch, an RF antenna, and the like, are provided in the display unit 102. Thus, various types of data are transmitted also from the display unit 102 to the operation unit 106. To transmit these pieces of data, a plurality of signal lines are wired in the connecting unit 104. Also, a power line for supplying power to the display unit 102 is wired in the connecting unit 104. However, if a plurality of signal lines and a power line are wired in the connecting unit 104, the lines are twisted or pulled due to the transformation of the connecting unit 104 and the lines may break.

On the other hand, if the movable range of the connecting unit 104 is limited to prevent the break of the lines, it becomes difficult to freely change the positional relationship between the display unit 102 and the operation unit 106, and the convenience of a user will decrease. Accordingly, in the present embodiment, a signal transmission method of a serial transmission scheme capable of reducing the number of lines is adopted. Moreover, the signal transmission method according to the present embodiment is improved for more efficient transmission of data, compared with a general signal transmission method of the serial transmission scheme. Therefore, when the signal transmission method according to the present embodiment is adopted, the number of lines passing through the connecting unit 104 is greatly reduced compared to a case of adopting a general signal transmission method of the serial transmission scheme.

For example, the number of lines can be reduced down to two coaxial cables, one 2-core coaxial cable, or one shielded 2-core flexible cable. As a result, the freedom of design of the mobile terminal 100 is increased, and also, the reliability of the lines passing through the connecting unit 104 is improved. Furthermore, with a small electronic device such as the mobile terminal 100, there is a concern for the influence of the EMI caused due to a signal, such as the display data or the like, transmitted at a high speed and at a high clock frequency. However, by adopting the signal transmission method according to the present embodiment, an effect of reducing such influence can also be obtained.

In the following, the signal transmission method of the present embodiment for achieving the effect as described above will be described in detail. But first, the configuration of an existing mobile terminal 10 will be briefly described with reference to FIG. 2.

Figure 2:
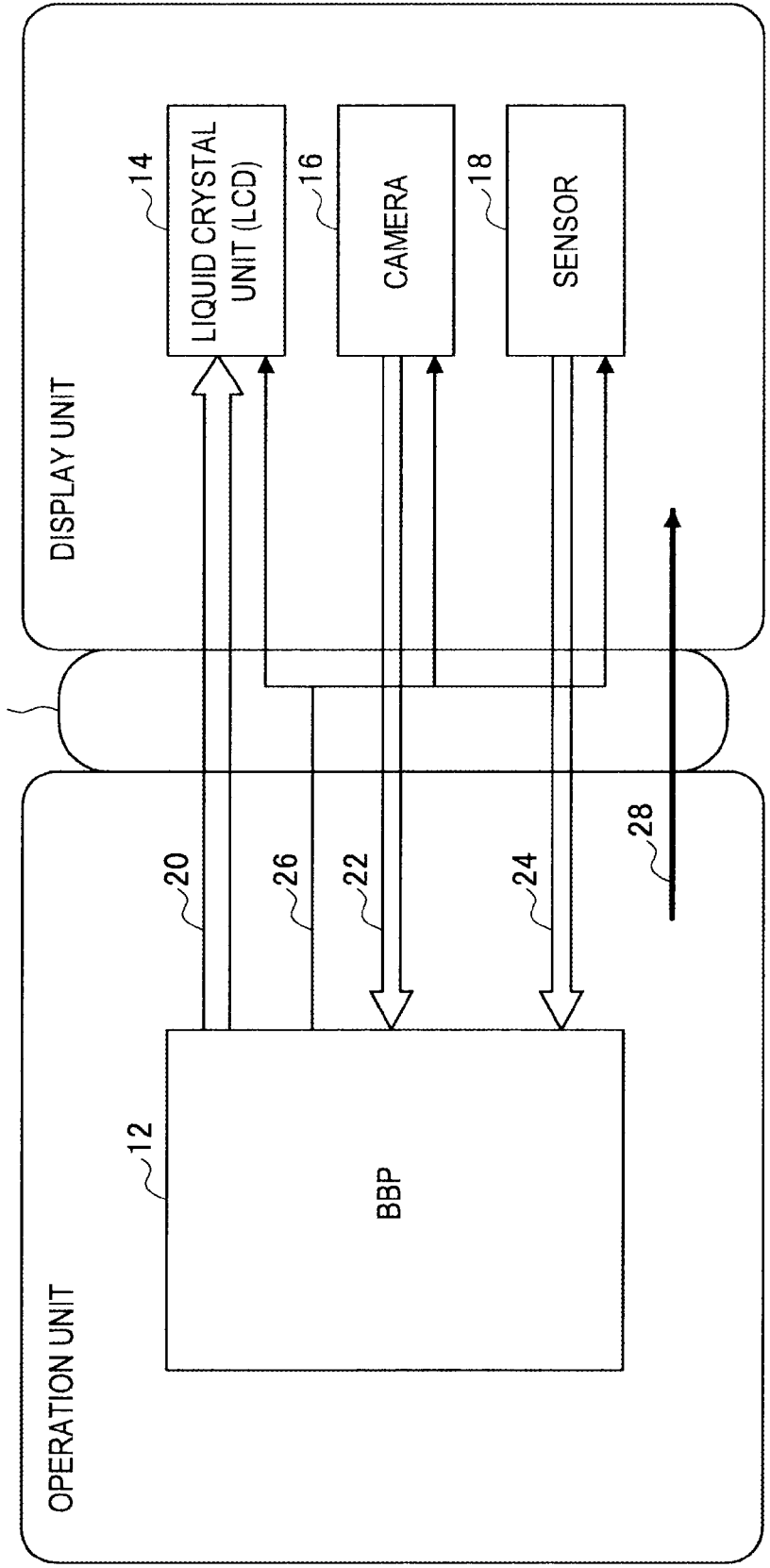
FIG. 2 is an explanatory diagram showing an example of a functional configuration of a mobile terminal according to a parallel transmission scheme.

Until now, a signal transmission method of a parallel transmission scheme has been adopted by many mobile phones as the mobile terminal 10 shown in FIG. 2. An operation unit and a display unit are provided to the mobile terminal 10, and they are connected by a connecting unit. A baseband processor 12 and a battery (not shown) are provided in the operation unit. The baseband processor 12 corresponds to the CPU mentioned above, and is an arithmetic processing apparatus for performing communication control, application execution, and the like. For its part, the display unit is mainly provided with a liquid crystal unit 14 (LCD), a camera 16, a sensor 18, and the like.

Furthermore, a parallel signal line 20 for transmitting display data from the baseband processor 12 to the liquid crystal unit 14 is provided. Furthermore, a parallel signal line 22 for transmitting image data from the camera 16 to the baseband processor 12 is provided. Also, a signal line 24 for transmitting sensor data from the sensor 18 to the baseband processor 12 is provided. Furthermore, in addition to these signal lines, a signal line 26 for transmitting a control signal from the baseband processor 12 to the liquid crystal unit 14, the camera 16 and the sensor 18 is provided. Furthermore, a power line 28 for supplying power from the operation unit to the display unit is provided.

In this manner, the parallel signal lines 20 and 22, the signal lines 24 and 26, and the power line 28 are wired in the connecting unit of the mobile terminal 10. The parallel signal lines 20 and 22 are respectively formed from about several or several tens of signal lines. Accordingly, the number of lines passing through the connecting unit of the mobile terminal 10 may exceed 40. Furthermore, even if the parallel signal lines 20 and 22 are serialized, the number of lines passing through the connecting unit is still too large to realize a desired movable range of the connecting unit due to the presence of the signal lines 24 and 26 for transmitting control signals, the power line 28, and the like. Thus, a refinement for reducing the number of lines passing through the connecting unit to about 1 or 2 is desired.

1-2: Functional Configuration of Mobile Terminal 100

Figure 3:
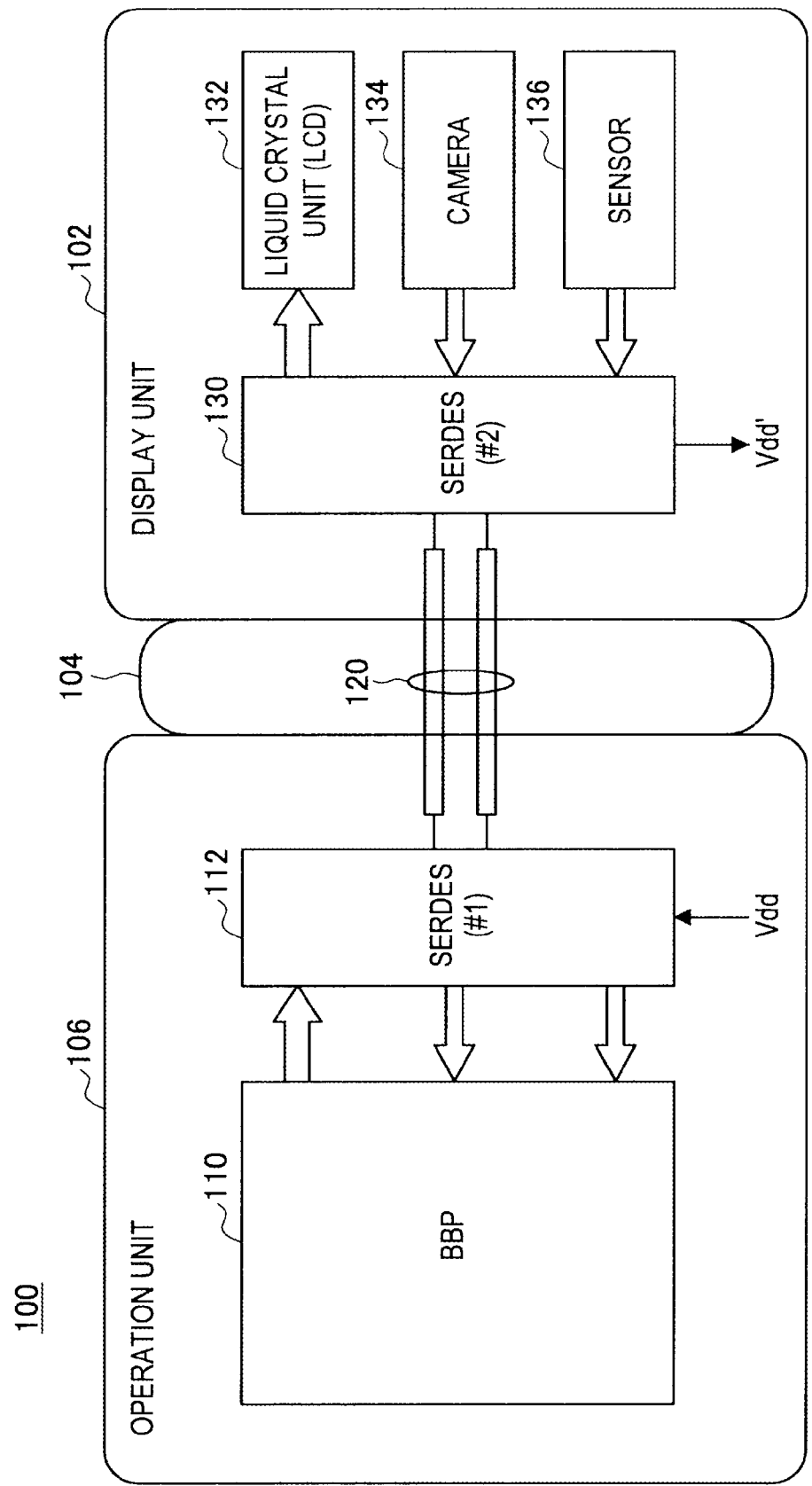
FIG. 3 is an explanatory diagram showing an example of a functional configuration of a mobile terminal according to an embodiment of the present invention.
Figure 4:
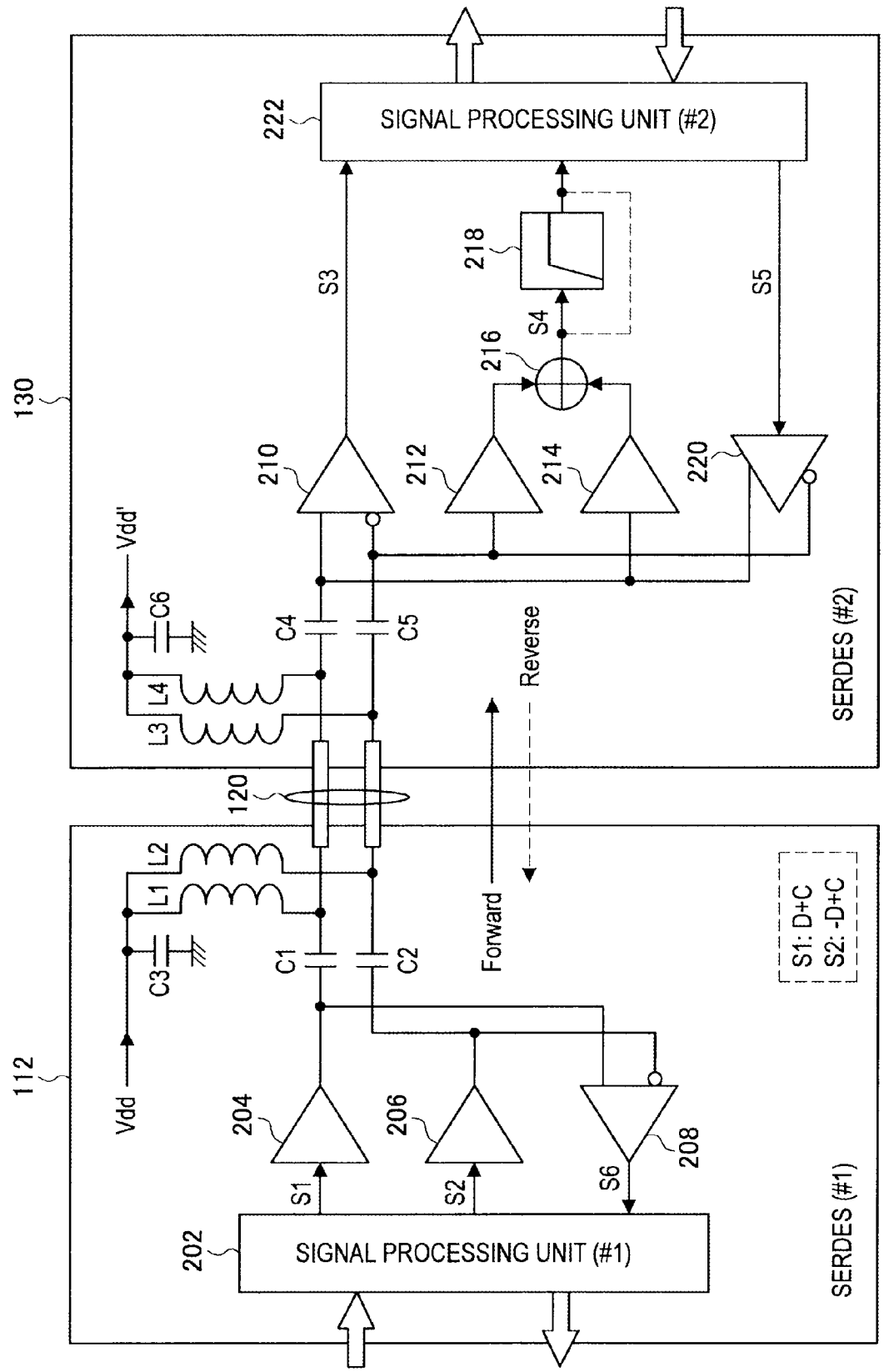
FIG. 4 is an explanatory diagram showing an example of a detailed configuration of a SERDES included in a mobile terminal according to an embodiment of the present invention.

Therefore, the inventor of the present invention has devised configurations of the mobile terminal 100 as shown in FIGS. 3 and 4. In the following, the configurations of the mobile terminal 100 according to the present embodiment will be described in detail. Additionally, the configurations shown in FIGS. 3 and 4 are only examples, and any modification is possible as long as it is within the technical scope of the present embodiment. Also, it is needless to say that a configuration obtained by such modification is, of course, included in the technical scope of the present embodiment.

First, the overall configuration of the mobile terminal 100 according to the present embodiment will be described with reference to FIG. 3. FIG. 3 is an explanatory diagram showing an overall configuration of the mobile terminal 100 according to the present embodiment. Additionally, as has been briefly explained with reference to FIG. 1, the mobile terminal 100 is mainly configured from the display unit 102, the connecting unit 104, and the operation unit 106. Also, the display unit 102 and the connecting unit 106 are connected by the connecting unit 104 formed from a movable member.

The operation unit 106 includes mainly a baseband processor 110, a serializer/deserializer 112 (a SERDES (#1)), and a power source (a battery; not shown). Also, the display unit 102 includes mainly a serializer/deserializer 130 (a SERDES (#2)), a liquid crystal unit 132 (LCD), a camera 134, and a sensor 136. Furthermore, two coaxial cables 120 are wired in the connecting unit 104. Additionally, one 2-core coaxial cable or one shielded 2-core flexible cable can also be used instead of the two coaxial cables 120.

First, when data, such as display data, control data and the like, are output from the baseband processor 110, these pieces of data are input to the serializer/deserializer 112 through the parallel signal line. Also, DC power Vdd is supplied to the serializer/deserializer 112. Thus, the serializer/deserializer 112 serializes and multiplexes the data that are input in parallel. Then, the serializer/deserializer 112 encodes the serialized data, and generates DC-free encoded data.

Next, the serializer/deserializer 112 generates a data signal based on the generated encoded data. This data signal is generated from the DC-free encoded data, and has a DC-free characteristic. Accordingly, even when the DC power Vdd is superimposed on the data signal, the data signal can be easily separated by cutting the DC component. Thus, the serializer/deserializer 112 superimposes the DC power Vdd on the data signal, and generates a transmission signal.

Then, the transmission signal generated by the serializer/deserializer 112 is transmitted to the serializer/deserializer 130 of the display unit 102 through the two coaxial cables 120. When the transmission signal is received through the two coaxial cables 120, the serializer/deserializer 130 separates the data signal and DC power Vdd' from the received transmission signal. Additionally, due to the attenuation occurring in the superimposition process by the serializer/deserializer 112, the transmission process through the coaxial cables 120, and the separation process by the serializer/deserializer 130, the voltage of the DC power Vdd' is lower than the voltage of the original DC power Vdd.

The DC power Vdd' separated by the serializer/deserializer 130 is supplied to each structural element of the display unit 102, and is used as driving power. On the other hand, threshold determination is performed for the data signal separated by the serializer/deserializer 130, and the original encoded data is restored based on the determination result. Furthermore, the encoded data is decoded by the serializer/deserializer 130, and the display data, the control data, and the like, are restored. The display data restored by the serializer/deserializer 130 is parallelized and input to the liquid crystal unit 132. Also, the control data and the like restored by the serializer/deserializer 130 are input to the devices of the transmission destinations (for example, the camera 134, the sensor 136, and the like).

On the other hand, when image data is output from the camera 134 and sensor data is output from the sensor 136, these pieces of data are input to the serializer/deserializer 130 through the parallel signal line. Then, the serializer/deserializer 130 serializes and multiplexes the data that are input in parallel. The serializer/deserializer 130 encodes the serialized data, and generates DC-free encoded data. Then, the serializer/deserializer 130 generates a data signal based on the encoded signal.

The data signal generated by the serializer/deserializer 130 is transmitted to the serializer/deserializer 112 of the operation unit 106 through the two coaxial cables 120. When the data signal is received through the two coaxial cables 120, the serializer/deserializer 112 performs threshold determination for the data signal, and restores the original encoded data based on the determination result. Furthermore, the serializer/deserializer 112 decodes the restored encoded data, and restores the original display data, the original control data, and the like. Then, the data restored by the serializer/deserializer 112 are parallelized and input to the baseband processor 110.

As described above, the two coaxial cables 120 (or a 2-core coaxial cable or a shielded 2-core flexible cable) are used for the signal transmission in the mobile terminal 100. Accordingly, a signal can be transmitted by a differential transmission scheme by using the two coaxial cables 120. The differential transmission scheme is a transmission scheme for transmitting signals of opposite phases by two transmission lines. Also, the differential transmission scheme has a characteristic that it is highly resistant to common-mode noise. Additionally, in the following explanation, transmission of signals of opposite phases through two transmission lines will be referred to as differential transmission, and transmission of signals in common mode through two transmission lines will be referred to as common-mode transmission.

The main purpose of the present embodiment is to realize efficient data transmission by combining the differential transmission and the common-mode transmission. In the following, the signal transmission method according to the present embodiment which is capable of achieving such purpose will be described in detail. Detailed functional configurations of the serializers/deserializers 112 and 130 are shown in FIG. 4 as configurations capable of realizing this signal transmission method. In the following, the signal transmission method of the present embodiment will be described in detail while introducing the functional configurations of the serializers/deserializers 112 and 130 according to the present embodiment.

(1-2-1: Configuration of SERDES (Forward))

First, the functional configurations of the serializers/deserializers 112 and 130 will be described with reference to FIG. 4. Additionally, an explanation will be given here regarding mainly an operation of signal transmission from the operation unit 106 to the display unit 102 (Forward operation).

(Configuration of Serializer/Deserializer 112)

As shown in FIG. 4, the serializer/deserializer 112 is configured mainly from a signal processing unit 202 (#1), common-mode drivers 204 and 206, a differential receiver 208, capacitors C1 and C2, a bypass capacitor C3, and choke coils L1 and L2.

(Configuration of Serializer/Deserializer 130)

Furthermore, the serializer/deserializer 130 is configured mainly from a differential receiver 210, common-mode receivers 212 and 214, an adder 216, a high-pass filter 218, a differential driver 220, a signal processing unit 222 (#2), capacitors C4 and C5, a bypass capacitor C6, and choke coils L3 and L4.

(Forward Operation: Serializer/Deserializer 112)

First, when data to be transmitted to the serializer/deserializer 112 is input, the signal processing unit 202 serializes the input data. Then, the signal processing unit 202 encodes the serialized data into a DC-free code, and generates encoded data D. Additionally, a parallel clock is input to the signal processing unit 202 from the baseband processor 110. Thus, the signal processing unit 202 generates a serial clock C (hereinafter, a clock C) by using a PLL (Phase-Locked Loop) or the like.

When the encoded data D and the clock C are generated, the signal processing unit 202 adds the encoded data D to the clock C, and generates addition data S1 (S1=D+C). Furthermore, the signal processing unit 202 subtracts the encoded data D from the clock C, and generates subtraction data S2 (S2=−D+C). The addition data S1 generated by the signal processing unit 202 is input to the common-mode driver 204. Furthermore, the subtraction data S2 generated by the signal processing unit 202 is input to the common-mode driver 206.

When the addition data S1 is input, the common-mode driver 204 generates a first transmission signal based on the addition data S1, and transmits the generated first transmission signal to the serializer/deserializer 130 through a first coaxial cable 120 (the upper cable in FIG. 4). Similarly, when the subtraction data S2 is input, the common-mode driver 206 generates a second transmission signal based on the subtraction data S2, and transmits the generated second transmission signal through a second coaxial cable 120 (the lower cable in FIG. 4). Additionally, the components of the encoded data that are transmitted through the two coaxial cables 120 are of opposite phases, and thus the components of the encoded data D are differentially transmitted. On the other hand, the components of the clock C are transmitted in common mode.

Additionally, the DC component of the first transmission signal output from the common-mode driver 204 is cut by the capacitor C1. Also, DC power Vdd whose high-frequency component is cut by the choke coil L1 is superimposed on the first transmission signal whose DC component is cut by the capacitor C1. Then, the first transmission signal on which the DC power Vdd is superimposed is transmitted to the serializer/deserializer 130 through the first coaxial cable 120.

Similarly, the DC component of the second transmission signal output from the common-mode driver 206 is cut by the capacitor C2. Also, DC power Vdd whose high-frequency component is cut by the choke coil C2 is superimposed on the second transmission signal. Then, the second transmission signal on which the DC power Vdd is superimposed is transmitted to the serializer/deserializer 130 through the second coaxial cable 120.

In this manner, the serializer/deserializer 112 divides the DC power Vdd and supplies the same through the two coaxial cables 120. Accordingly, it becomes possible to lower the DC resistance of the coaxial cables 120 to half, and the voltage drop can be reduced. Furthermore, it becomes possible to reduce the power noise, and the transmission quality can be improved.

(Forward Operation: Serializer/Deserializer 130)

As described, the first and second transmission signals transmitted through the two coaxial cables 120 are input to the serializer/deserializer 130. As described above, the DC power Vdd is superimposed on the first and second transmission signals input to the serializer/deserializer 130 at the time of transmission.

The high-frequency component is cut by the choke coil L3 and the DC component is separated from the first transmission signal input to the serializer/deserializer 130, and the DC component is cut by the capacitor C4 and the high-frequency component is separated therefrom. Similarly, the high-frequency component is cut by the choke coil L4 and the DC component is separated from the second transmission signal input to the serializer/deserializer 130, and the DC component is cut by the capacitor C5 and the high-frequency component is separated therefrom.

The DC components output from the choke coils L3 and L4 are output as the DC power Vdd'. On the other hand, the high-frequency component output from the capacitor C4 is input to the differential receiver 210 and the common-mode receiver 214 as the component of the first transmission signal. Furthermore, the high-frequency component output from the capacitor C5 is input to the differential receiver 210 and the common-mode receiver 212 as the component of the second transmission signal.

The components of the clock C that have been transmitted in common mode and the components of the encoded data that have been differentially transmitted are included in the components of the first and second transmission signals. Accordingly, the components of the clock C included in the components of the first and second transmission signals that are input are cancelled at the differential receiver 210. Then, only the components of the encoded data D included in the components of the first and second transmission signals are output from the differential receiver 210. The components of the encoded data output from the differential receiver 210 are input to the signal processing unit 222 as a received differential signal S3 corresponding to the encoded data D. The received differential signal S3 correspond to S1−S2=2*D.

Furthermore, the components of the first and second transmission signals input to the common-mode receivers 212 and 214 are input to the adder 216. When the component of the first transmission signal and the component of the second transmission signal are added by the adder 216, the components of the encoded data D included in the components of the first and second transmission signals are cancelled. Accordingly, only the components of the clock C included in the components of the first and second transmission signals are output from the adder 216. The components of the clock C output from the adder 216 are input to the high-pass filter 218 as a received common-mode signal S4. The received common-mode signal S4 corresponds to S1+S2=2*C.

Moreover, most of the low-frequency noise (mainly the power noise) included in the components of the first and second transmission signals is cut by a high-pass filter configured from the capacitors C4 and C5 and the chock coils L3 and L4 of the serializer/deserializer 130. Particularly, regarding the components of the encoded data D that have been differentially transmitted, the low-frequency noises occurring in common in the signals of opposite phases are cancelled out at the time of reception in differential mode, and thus the influence of the low-frequency noise is small.

However, regarding the components of the clock C that have been transmitted in common mode, the noise will be amplified at the adder 216, and therefore, it is preferable to have the amplified low-frequency noise cut. For this reason, the high-pass filter 218 is provided after the adder 216. The low-frequency noise included in the received common-mode signal S4 is cut at the high-pass filter 218. Then, the received common-mode signal S4 whose low-frequency noise is cut by the high-pass filter 218 is input to the signal processing unit 222.

The signal processing unit 222 regenerates the clock C from the received common-mode signal S4 that is input. Also, the signal processing unit 222 restores the encoded data D from the received differential signal S3 that is input. Then, the signal processing unit 222 decodes the encoded data D by using the regenerated clock C, and restores the original data. Furthermore, the signal processing unit 222 parallelizes and outputs the restored data.

As described, by combining the differential transmission and the common-mode transmission, the encoded data D, the clock C and the DC power Vdd can be simultaneously transmitted by using the two coaxial cables 120. Also, since the power is divided and transmitted through the two coaxial cables 120, the DC resistance of the coaxial cables 120 can be lowered and the voltage drop can be reduced. Furthermore, it becomes possible to reduce the power noise. Furthermore, by cutting the low-frequency noise from the signal that has been transmitted in common mode (the received common-mode signal S4) by using the high-pass filter 218, a high transmission quality can be realized.

(1-2-2: Configuration of SERDES (Reverse))

Next, an operation of signal transmission from the display unit 102 to the operation unit 106 will be described (Reverse operation).

First, transmission data S5 is output from the signal processing unit 222, and is input to the differential driver 220. Here, the transmission data S5 is encoded data D' obtained by encoding data into a DC-free code. When the transmission data S5 is input, the differential driver 220 generates a third and a fourth transmission signals that are of opposite phases, based on the transmission data S5. That is, the third transmission signal corresponds to D', and the fourth transmission signal corresponds to −D'. Then, the differential driver 220 transmits the third and the fourth transmission signals through the two coaxial cables 120.

Here, DC components of the third and the fourth transmission signals output from the differential driver 220 are cut respectively by the capacitor C4 or C5, and the DC power Vdd supplied from the serializer/deserializer 112 is superimposed the third and the fourth transmission signals in the transmission line. Then, the third and the fourth transmission signals on which the DC power Vdd is superimposed are input to the serializer/deserializer 112, and the DC components are cut by the capacitors C1 and C2, and only the components of the third and the fourth transmission signals are input to the differential receiver 208.

A difference between the third transmission signal and the fourth transmission signal is generated (a received differential signal S6) at the differential receiver 208, and is input to the signal processing unit 202. Accordingly, the received differential signal S6 corresponds to D'−(−D')=2*D'. When the received differential signal S6 is input, the signal processing unit 202 restores encoded data D' from the received differential signal S6. Furthermore, the signal processing unit 202 decodes the encoded data D' by using the clock C, and restores the original data. A signal is differentially transmitted from the display unit 102 to the operation unit 106 in this manner.

Additionally, in the case of transmitting a signal from the display unit 102 to the operation unit 106, the clock C has to be supplied from the display unit 102 to the operation unit 106. Accordingly, in the case of transmitting a signal from the display unit 102 to the operation unit 106, the first and second transmission signals corresponding to data S1=S2=C are transmitted from the common-mode drivers 204 and 206.

In this case, the clock C is obtained from the received common-mode signal S4 at the serializer/deserializer 130 that received the first and second transmission signals. On the other hand, the encoded data D' is obtained from the received differential signal S6 at the serializer/deserializer 112. Bidirectional signal transmission is realized by the above-described configuration in this manner.

Heretofore, the functional configuration of the mobile terminal 100 according to the present embodiment has been described in detail. Although a common-mode choke coil and a differential-mode choke coil are not used in the configuration example described above, use of these elements is effective in view of the EMI or the like, provided the size of the elements is acceptable.

Furthermore, an example has been shown above in which the encoded data D and the clock C are simultaneously transmitted from the operation unit 106 to the display unit 102, but the combination of data or of clocks to be simultaneously transmitted can be changed. In the following, an explanation will be given on the signal transmission method according to the present embodiment, and furthermore, an example of a combination of data or of clocks to be simultaneously transmitted that can be applied to this signal transmission method will also be introduced.

1-3: Signal Transmission Method

In the following, the signal transmission method according to the present embodiment will be concretely described with reference to FIGS. 5 to 8. Additionally, the horizontal axes of the graphs shown in the drawings are time axes, and the vertical axes show signal amplitude.

(1-3-1: AMI Code+⅛ CLK)

Figure 5:
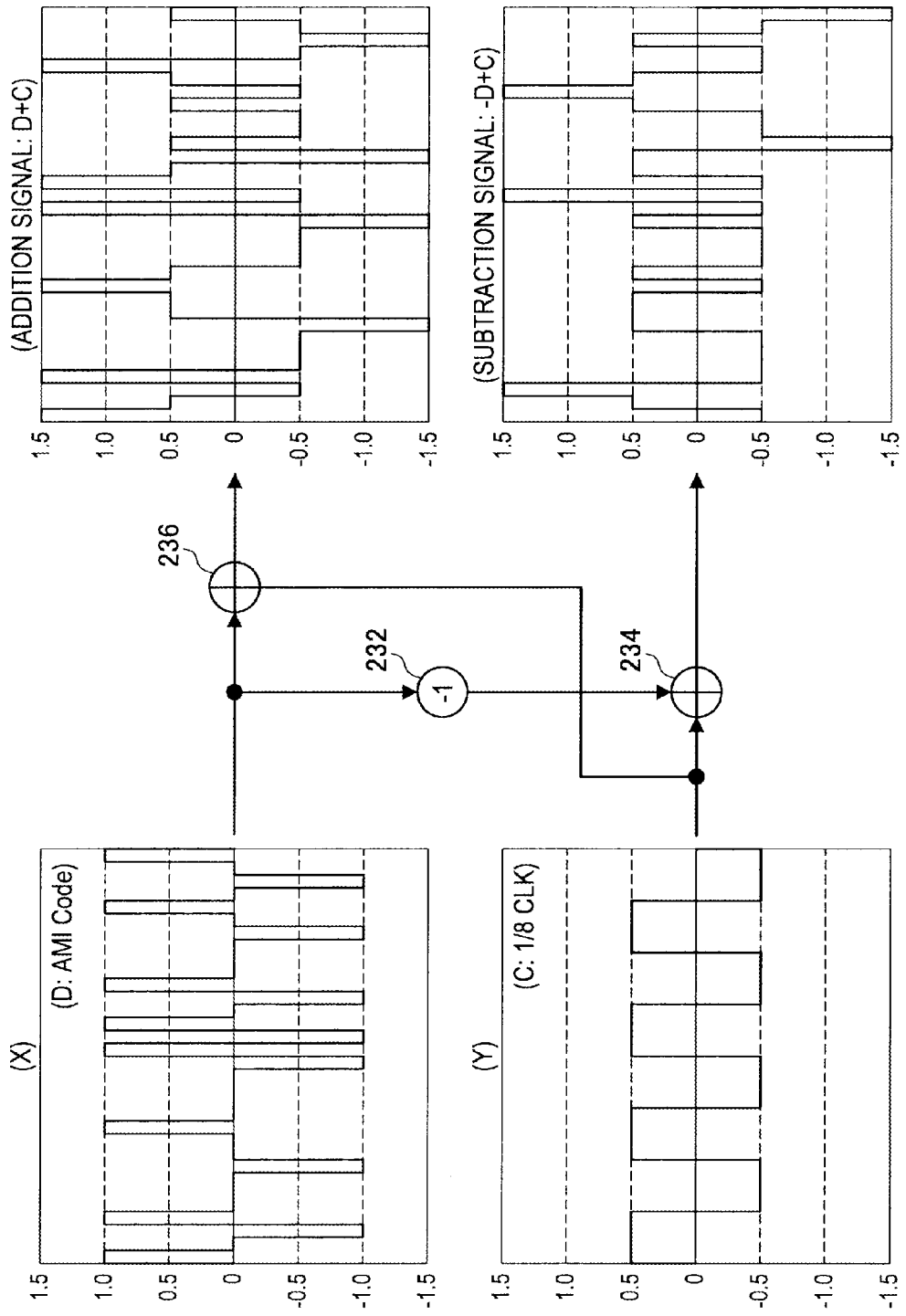
FIG. 5 is an explanatory diagram showing an example of a signal transmission method according to an embodiment of the present invention.

First, reference will be made to FIG. 5. FIG. 5 shows the signal waveforms of the first transmission signal (an addition signal) and the second transmission signal (a subtraction signal) that are generated at the time of transmitting the encoded data D and the clock C in the mobile terminal 100, as well as a signal generation method.

(AMI Code)

In the example of FIG. 5, the encoded data D is that which is obtained by encoding certain data into an AMI code. The AMI code is obtained by expressing a data value 0 by a code 0 and a data value 1 by a code +A or −A (A is any positive number). Note that the code +A and the code −A are used alternately. For example, after a data value 1 has been expressed by the code +A, if a data value 1 appears again, this data value 1 will be expressed by the code −A. Since the codes+A and −A are inverted by a toggle, the AMI code will be a code that does not include a DC component.

(Signal Waveform)

The encoded data D is expressed by a signal waveform with three amplitude levels (1, 0, −1) as shown in (X) of FIG. 5, for example. On the other hand, the waveform of the clock C is expressed as (Y) of FIG. 5. Note that the waveform of the clock C shown in (Y) of FIG. 5 has a frequency corresponding to ⅛ of the transmission speed of the encoded data D, and amplitude half that of the encoded data D. The encoded data D is differentially transmitted, whereas the clock C is transmitted in common mode. The common-mode transmission is susceptible to noise compared to the differential transmission. Accordingly, to lessen the influence of noise, it is preferable to set the frequency of the clock C low (for example, ⅛) as shown in the example of FIG. 5. In this case, however, it becomes necessary to multiply the clock C by using a PLL to obtain a bit clock at the serializer/deserializer 130.

(Transmission Method: Transmitting Side)

First, the encoded data D is input to an inverter 232 and is inverted, and then it is input to an adder 234. The clock C is also input to the adder 234. The encoded data D that has been inverted and the clock C are added by the adder 234, and subtraction data (S2=−D+C) is generated. Furthermore, the encoded data D is input to an adder 236. The clock C is also input to the adder 236. The encoded data D and the clock C are added by the adder 236, and addition data (S1=D+C) is generated. The waveform of the addition data S1 will be as the addition signal with four levels illustrated in FIG. 5, and the waveform of the subtraction data S2 will be as the subtraction signal with four levels illustrated in FIG. 5. Transmission signals having these waveforms are transmitted to a receiving side.

(Transmission Method: Receiving Side)

First, by subtracting the subtraction signal from the addition signal, a waveform with the same form as (X) of FIG. 5 and with amplitude two times that of (X) of FIG. 5 is obtained. This subtraction process is performed at the differential receiver 210 of the serializer/deserializer 130. Also, by adding the addition signal and the subtraction signal, a waveform with the same form as (Y) of FIG. 5 and with amplitude two times that of (Y) of FIG. 5 is obtained. This addition process is performed at the adder 216 of the serializer/deserializer 130. Additionally, the encoded data D and the clock C are restored from these waveforms.

As described, by combining the differential transmission and the common-mode transmission, the AMI code data and a ⅛ clock can be transmitted at the same time.

(1-3-2: AMI Code+½ CLK)

Figure 6:
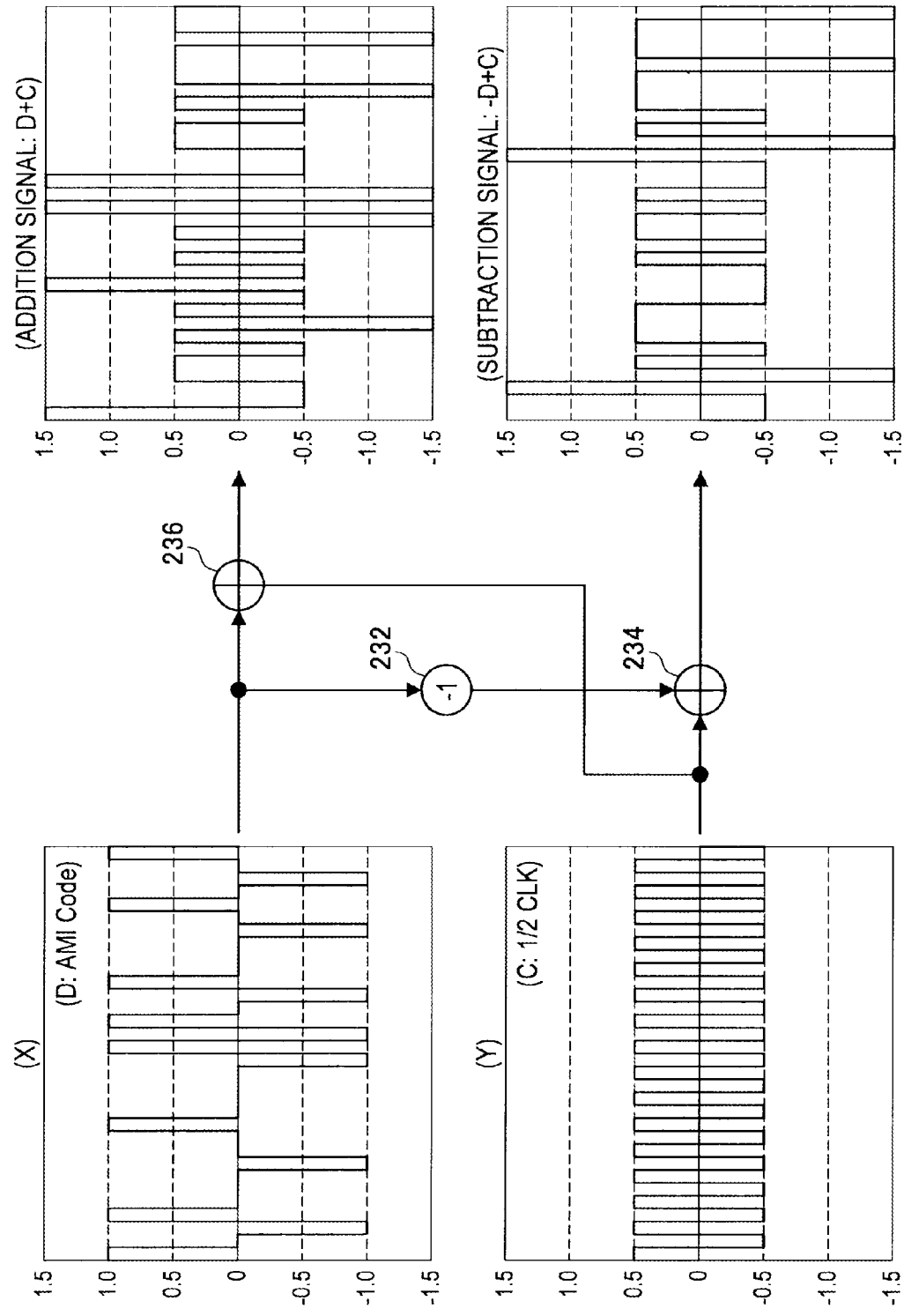
FIG. 6 is an explanatory diagram showing an example of a signal transmission method according to an embodiment of the present invention.

Next, reference will be made to FIG. 6. FIG. 6 shows the signal waveforms of the first transmission signal (an addition signal) and the second transmission signal (a subtraction signal) that are generated at the time of transmitting the encoded data D and the clock C in the mobile terminal 100, as well as a signal generation method.

(Signal Waveform)

In the example of FIG. 6, the encoded data D is that which is obtained by encoding data into an AMI code by the signal processing unit 202. Accordingly, the waveform of (X) of FIG. 6 is the same as that of (X) of FIG. 5. On the other hand, the waveform of the clock C shown in (Y) of FIG. 6 has a frequency corresponding to ½ of the transmission speed of the encoded data D, and amplitude half that of the encoded data D. When the clock C of a frequency corresponding to transmission speed half that of the encoded data D is used, the encoded data D can be decoded without a PLL by using both edges of the clock C. Accordingly, it becomes unnecessary to multiply the clock C by a PLL at the serializer/deserializer 130.

(Transmission Method: Transmitting Side)

First, the encoded data D is input to the inverter 232 and is inverted, and then it is input to the adder 234. The clock C is also input to the adder 234. The encoded data D that has been inverted and the clock C are added by the adder 234, and subtraction data (S2=−D+C) is generated. Furthermore, the encoded data D is input to the adder 236. The clock C is also input to the adder 236. The encoded data D and the clock C are added by the adder 236, and addition data (S1=D+C) is generated. The waveform of the addition data S1 will be as the addition signal with four levels illustrated in FIG. 6, and the waveform of the subtraction data S2 will be as the subtraction signal with four levels illustrated in FIG. 6. Transmission signals having these waveforms are transmitted to a receiving side.

(Transmission Method: Receiving Side)

First, by subtracting the subtraction signal from the addition signal, a waveform with the same form as (X) of FIG. 6 and with amplitude two times that of (X) of FIG. 6 is obtained. This subtraction process is performed at the differential receiver 210 of the serializer/deserializer 130. Also, by adding the addition signal and the subtraction signal, a waveform with the same form as (Y) of FIG. 6 and with amplitude two times that of (Y) of FIG. 6 is obtained. This addition process is performed at the adder 216 of the serializer/deserializer 130. Additionally, the encoded data D and the clock C are restored from these waveforms.

As described, by combining the differential transmission and the common-mode transmission, the AMI code data and a ½ clock can be transmitted at the same time.

(1-3-3: AMI Code+Manchester Code)

Figure 7:
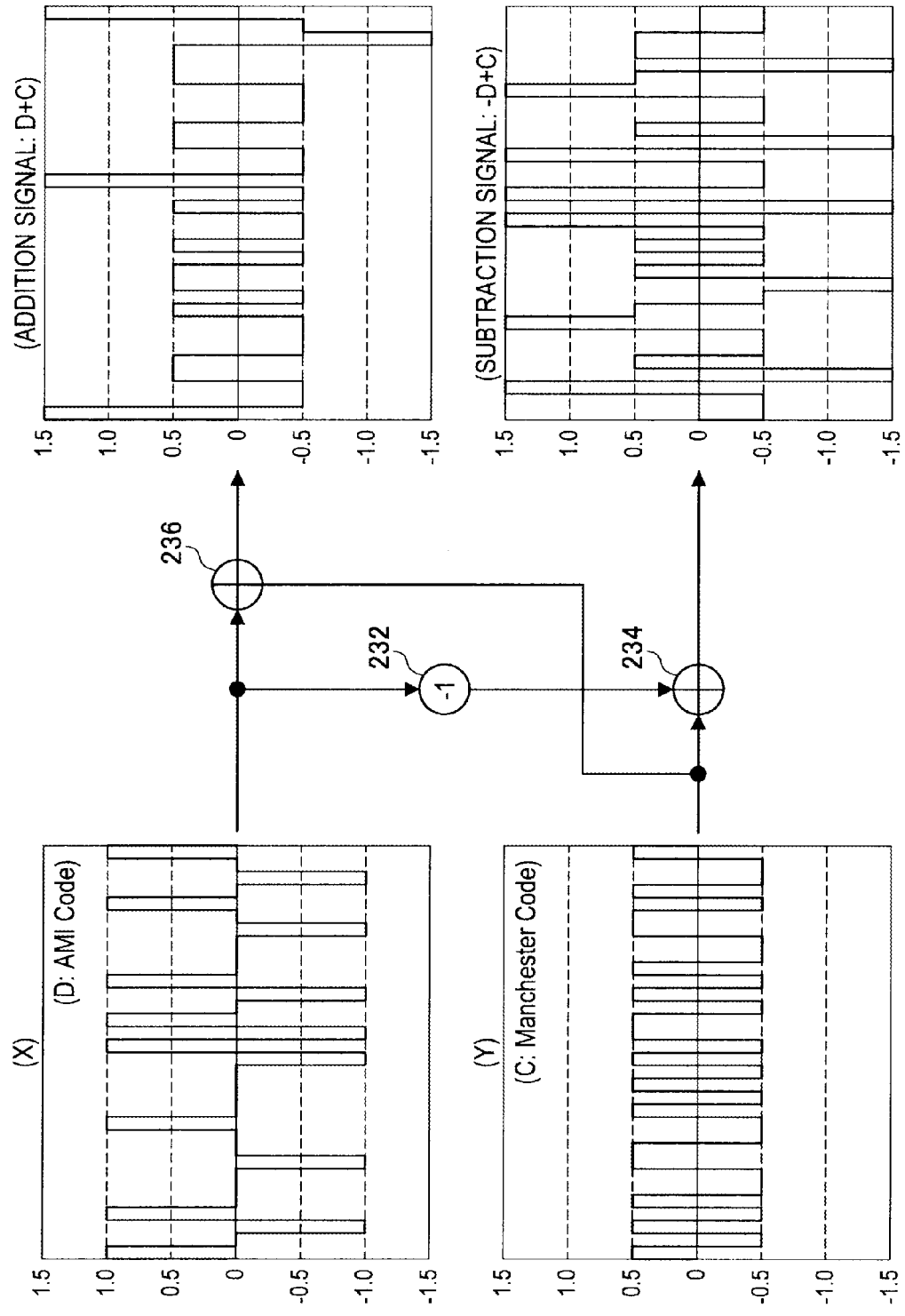
FIG. 7 is an explanatory diagram showing an example of a signal transmission method according to an embodiment of the present invention.

Next, reference will be made to FIG. 7. The example of FIG. 7 relates to a method of transmitting two different pieces of encoded data by combining the differential transmission and the common-mode transmission. FIG. 7 shows the signal waveforms of the first transmission signal (an addition signal) and the second transmission signal (a subtraction signal) that are generated based on AMI encoded data D and Manchester encoded data C in the mobile terminal 100, as well as a signal generation method.

(Signal Waveform)

In the example of FIG. 7, the AMI encoded data D is that which is obtained by encoding data into an AMI code by the signal processing unit 202. Accordingly, the waveform of (X) of FIG. 7 is the same as that of (X) of FIG. 5. On the other hand, the Manchester encoded data C is that which is obtained by encoding data into a Manchester code by the signal processing unit 202. The Manchester code is obtained by expressing a data value 0 by a code 10, and a data value 1 by a code 01. Accordingly, like the AMI code, the Manchester code does not include a DC component.

In the example of FIG. 7, the same bit clock is set for the AMI encoded data D obtained by AMI encoding and the Manchester encoded data C obtained by Manchester encoding. However, since 1-bit data is expressed by a 2-bit code according to the Manchester code, the transmission speed will be half that of the AMI code. In the example of FIG. 7, a clock for regenerating the bit clock is not transmitted to the serializer/deserializer 130. Accordingly, the bit clock has to be regenerated, at the serializer/deserializer 130, from the AMI encoded data D or the Manchester encoded data C by using a PLL.

(Transmission Method: Transmitting Side)

In the example of FIG. 7, the AMI encoded data D is differentially transmitted. Accordingly, the AMI encoded data D is input to the inverter 232 and is inverted, and then it is input to the adder 234. The Manchester encoded data C is also input to the adder 234. The AMI encoded data D that has been inverted and the Manchester encoded data C are added by the adder 234, and subtraction data (S2=−D+C) is generated.

Furthermore, the AMI encoded data D is input to the adder 236. The Manchester encoded data C is also input to the adder 236. The AMI encoded data D and the Manchester encoded data C are added by the adder 236, and addition data (S1=D+C) is generated. The waveform of the addition data S1 will be as the addition signal with four levels illustrated in FIG. 7, and the waveform of the subtraction data S2 will be as the subtraction signal with four levels illustrated in FIG. 7. Transmission signals having these waveforms are transmitted to a receiving side.

(Transmission Method: Receiving Side)

First, by subtracting the subtraction signal from the addition signal, a waveform with the same form as (X) of FIG. 7 and with amplitude two times that of (X) of FIG. 7 is obtained. This subtraction process is performed at the differential receiver 210 of the serializer/deserializer 130. Also, by adding the addition signal and the subtraction signal, a waveform with the same form as (Y) of FIG. 7 and with amplitude two times that of (Y) of FIG. 7 is obtained. This addition process is performed at the adder 216 of the serializer/deserializer 130. Additionally, the AMI encoded data D and the Manchester encoded data C are restored from these waveforms.

As described, by combining the differential transmission and the common-mode transmission, the AMI encoded data D and the Manchester encoded data C can be transmitted at the same time.

(1-3-4: AMI Code+Multilevel Code (Manchester Code+⅛ CLK))

Next, reference will be made to FIG. 8. The example of FIG. 8 relates to a method of simultaneously transmitting two different pieces of encoded data (AMI encoded data, Manchester encoded data) and a clock by combining the differential transmission and the common-mode transmission. Here, the clock is to be transmitted in a form of multilevel encoded data that is obtained by synchronously adding the clock and the Manchester encoded data with the edges aligned.

Figure 8:
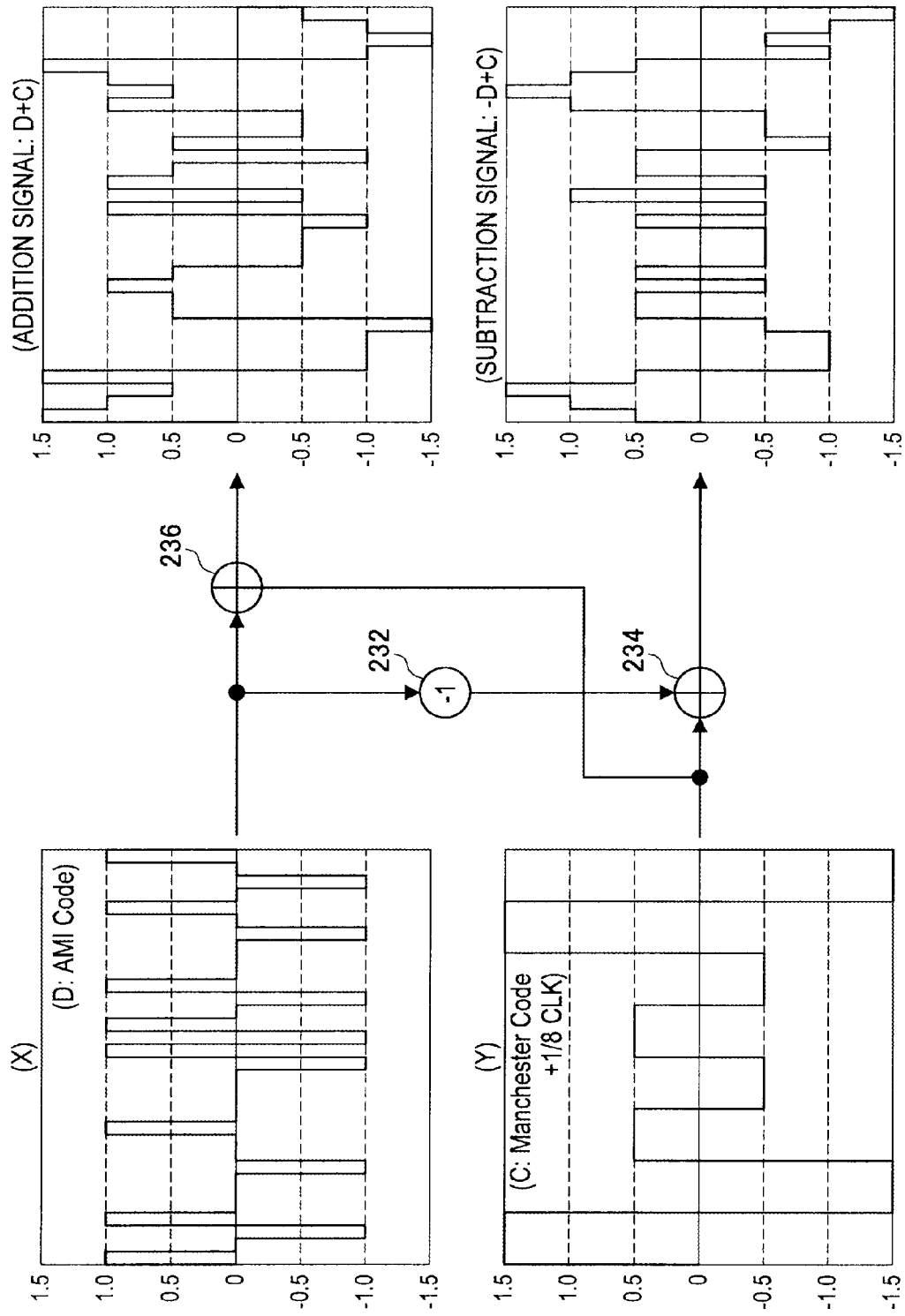
FIG. 8 is an explanatory diagram showing an example of a signal transmission method according to an embodiment of the present invention.

FIG. 8 shows the signal waveforms of the first transmission signal (an addition signal) and the second transmission signal (a subtraction signal) that are generated at the time of transmitting AMI encoded data D and Manchester encoded data C in the mobile terminal 100, as well as a signal generation method.

(Signal Waveform)

In the example of FIG. 8, the AMI encoded data D is that which is obtained by encoding data into an AMI code by the signal processing unit 202. Accordingly, the waveform of (X) of FIG. 8 is the same as that of (X) of FIG. 5. On the other hand, the Manchester encoded data C is that which is obtained by encoding data into a Manchester code and synchronously adding a clock to the obtained Manchester encoded data with the edges aligned by the signal processing unit 202. Since a Manchester code and a clock, neither having a DC component, are synchronously added, the multilevel encoded data does not, like the AMI code, include a DC component.

As shown in (Y) of FIG. 8, the waveform of the multilevel encoded data C takes four levels of amplitude, i.e. 1.5, 0.5, −0.5, −1.5, for example. This is a type of an ASK (Amplitude Shift Keying) modulated code. Furthermore, with the waveform of the multilevel encoded data C, the amplitude crosses zero every half cycle of the bit rate. Thus, by detecting the timing of the amplitude of the multilevel encoded data C crossing zero by using a comparator, a clock can be extracted at the serializer/deserializer 130 without using a PLL. However, in the example of FIG. 8, since the frequency of the clock included in the multilevel encoded data C corresponds to ⅛ of the transmission speed of the AMI encoded data D, the extracted clock has to be multiplied by using a PLL to regenerate a bit clock.

(Transmission Method: Transmitting Side)

In the example of FIG. 8, the AMI encoded data D is differentially transmitted. Accordingly, the AMI encoded data D is input to the inverter 232 and is inverted, and then it is input to the adder 234. The multilevel encoded data C is also input to the adder 234. The AMI encoded data D that has been inverted and the multilevel encoded data C are added by the adder 234, and subtraction data (S2=−D+C) is generated.

Furthermore, the AMI encoded data D is input to the adder 236. The multilevel encoded data C is also input to the adder 236. The AMI encoded data D and the multilevel encoded data C are added by the adder 236, and addition data (S1=D+C) is generated. The waveform of the addition data S1 will be as the addition signal with four levels illustrated in FIG. 8, and the waveform of the subtraction data S2 will be as the subtraction signal with four levels illustrated in FIG. 8. Transmission signals having these waveforms are transmitted to a receiving side.

(Transmission Method: Receiving Side)

First, by subtracting the subtraction signal from the addition signal, a waveform with the same form as (X) of FIG. 8 and with amplitude two times that of (X) of FIG. 8 is obtained. This subtraction process is performed at the differential receiver 210 of the serializer/deserializer 130. Also, by adding the addition signal and the subtraction signal, a waveform with the same form as (Y) of FIG. 8 and with amplitude two times that of (Y) of FIG. 8 is obtained. This addition process is performed at the adder 216 of the serializer/deserializer 130. Additionally, the AMI encoded data D and the multilevel encoded data C are restored from these waveforms. Furthermore, the Manchester encoded data and the clock are restored from the multilevel encoded data C.

As described, by combining the differential transmission and the common-mode transmission, the AMI encoded data, the Manchester encoded data, and a clock can be transmitted at the same time.

Heretofore, the signal transmission methods of the present embodiment have been described. Combinations among an AMI code, a Manchester code, a ½ clock, and a ⅛ clock have been taken as examples here for the sake of explanation, but other codes having a DC-free characteristic can also be used for the signal transmission methods described above.

It is conceivable to use, as the others code, any code having a DC-free characteristic, such as a CMI (Coded Mark Inversion) code, a partial response code (PR(1, −1), PR(1, 0, −1), PR(1, 0, ..., −1), etc.), or the like. Furthermore, it is possible to appropriately change the frequency of a clock. Additionally, these modifications are, of course, within the technical scope of the present embodiment.

1-4: (Modified Example) Analogue Addition Scheme

Figure 9:
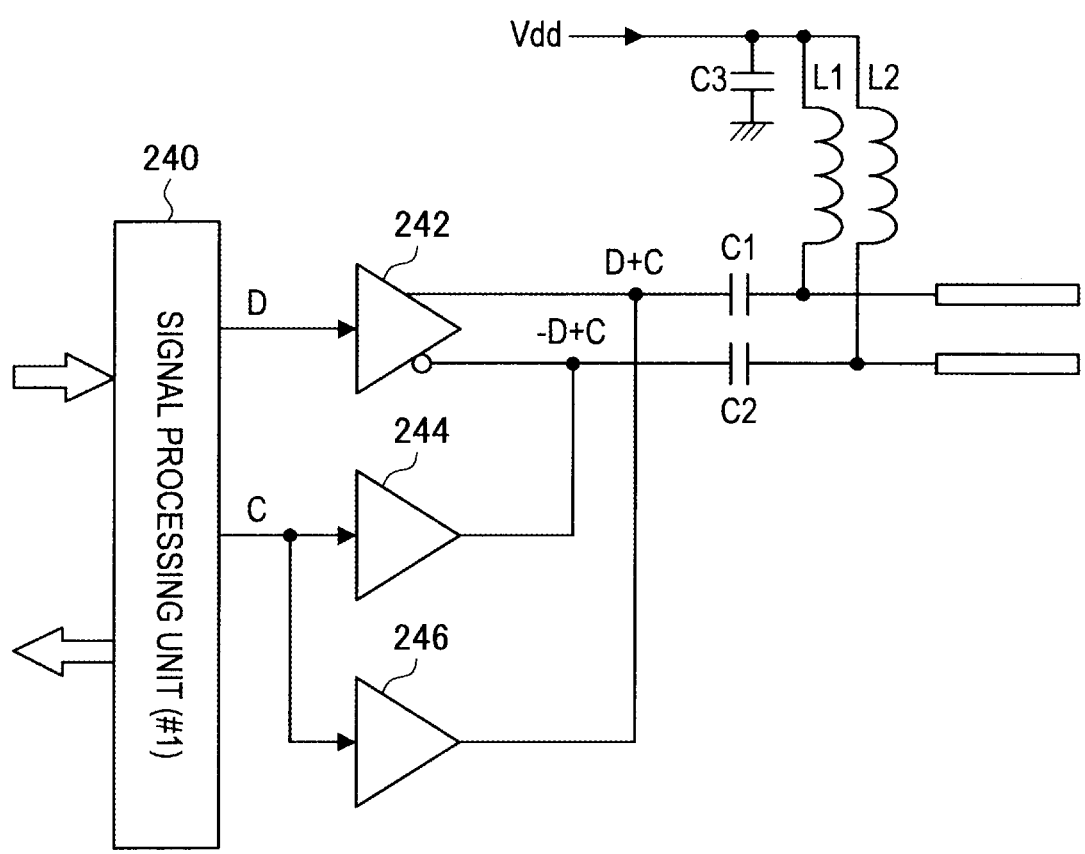
FIG. 9 is an explanatory diagram showing a modified example in relation to a partial configuration of a mobile terminal according to an embodiment of the present invention.
Figure 10:
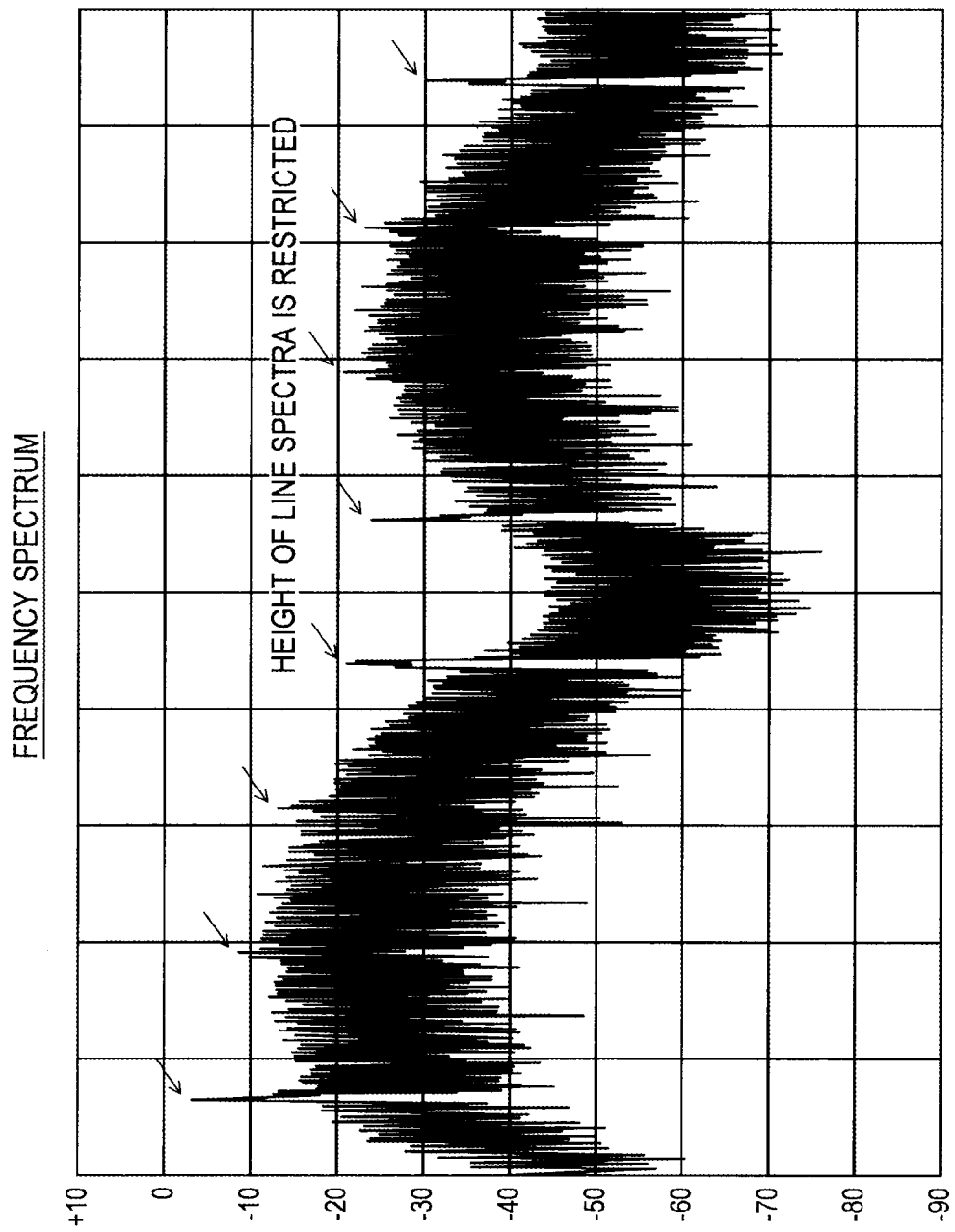
FIG. 10 is an explanatory diagram showing a frequency spectrum of a transmission signal according to an embodiment of the present invention (corresponding to FIG. 5)

In the explanation above, it was assumed to digitally synthesize the waveforms of two pieces of data (or clock) D and C by the signal processing unit 202. However, it is also possible to synthesize two signals in an analogue manner. Thus, a modified example of the mobile terminal 100 relating to analogue synthesis of signal waveforms will be described with reference to FIG. 9. FIG. 9 is an explanatory diagram showing a partial configuration of the serializer/deserializer 112 according to a modified example of the present embodiment.

As shown in FIG. 9, the serializer/deserializer 112 mainly includes, as structural elements relating to a transmission operation, a signal processing unit 240, a differential driver 242, common-mode drivers 244 and 246, capacitors C1 and C2, a bypass capacitor C3, and choke coils L1 and L2. Additionally, an explanation will be given here taking an example of synthesizing the common-mode data C and the differential data D and transmitting the same. Note that the combination of the targets to be synthesized can be appropriately changed as shown in FIGS. 5 to 8.

Unlike the example of FIG. 4, the signal processing unit 240 inputs the differential data D to the differential driver 242, and inputs the common-mode data C to the common-mode drivers 244 and 246. When the differential data D is input, the differential driver 242 generates a first transmission signal and a second transmission signal having opposite phases based on the differential data D. For example, the first transmission signal corresponds to +D, and the second transmission signal corresponds to −D. Furthermore, the common-mode drivers 244 and 246 respectively generates a third transmission signal or a fourth transmission signal based on the common-mode data C. The third and the fourth transmission signals correspond to +C.

The first transmission signal output from the differential driver 242 and the fourth transmission signal output from the common-mode driver 246 are superimposed in the transmission line, and an addition signal (D+C) is generated. The addition signal that is generated is superimposed, after having a DC component cut by the capacitor C1, on DC power Vdd whose high-frequency component is cut by the choke coil L2, and is transmitted.

Similarly, the second transmission signal output from the differential driver 242 and the third transmission signal output from the common-mode driver 244 are superimposed in the transmission line, and a subtraction signal (−D+C) is generated. The subtraction signal that is generated is superimposed, after having a DC component cut by the capacitor C2, on DC power Vdd whose high-frequency component is cut by the choke coil L2, and is transmitted.

As described, it is also possible to synthesize a signal to be transmitted in common mode and a signal to be differentially transmitted in an analogue manner. However, in the case of analogue synthesis, it is necessary to give consideration to the output impedance of the differential driver 242 and the common-mode drivers 244 and 246, the arrangement of lines, and the like.

Heretofore, the signal transmission methods of the present embodiment have been described in detail. As described above, the signal transmission methods according to the present embodiment are for simultaneously transmitting power and two signals having a DC-free characteristic by using two coaxial cables (or one 2-core coaxial cable or one shielded 2-core flexible cable), the power being transmitted in common-mode and the two signals being transmitted with the differential components added together and the common-mode components added together.

By adopting these signal transmission methods, power supply and unidirectional simultaneous transmission via two independent channels can be realized by using two coaxial cables. As a result, the number of lines in the hinge portion of an electronic device such as a mobile phone can be greatly reduced.

Furthermore, by transmitting a clock in common mode, the amplitude of the clock transmitted by one coaxial cable can be reduced to half, and the height of line spectra appearing in the frequency spectrum (see FIG. 10) of a transmission signal due to the clock is restricted. As a result, it becomes possible to restrict the influence of EMI or the like on radio communication. Additionally, the frequency spectrum shown in FIG. 10 corresponds to D+C or −D+C shown in FIG. 5.

2: Second Embodiment

Next, the second embodiment of the present invention will be described. This embodiment relates to a technology for realizing bidirectional full-duplex transmission by using two coaxial cables. Additionally, one 2-core coaxial cable or one shielded 2-core flexible cable can also be used instead of two coaxial cables. However, in the following description, a case where two coaxial cables are used will be described as an example for the sake of explanation.

<2-1: Functional Configuration of Mobile Terminal 300>

Figure 11:
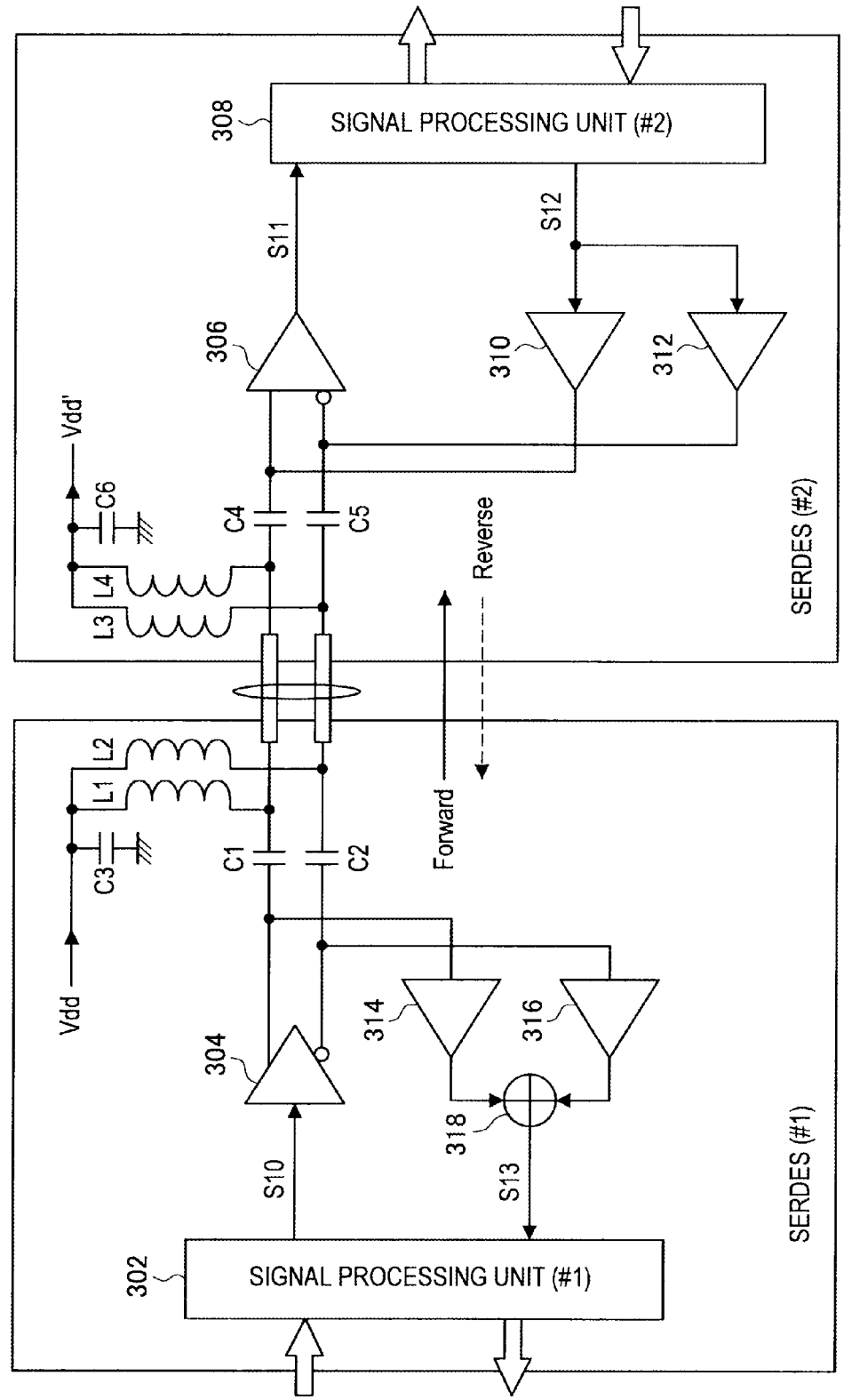
FIG. 11 is an explanatory diagram showing an example of a configuration of a SERDES included in a mobile terminal according to another embodiment of the present invention.

The functional configuration of a mobile terminal 300 according to the present embodiment will be described with reference to FIG. 11. FIG. 11 is an explanatory diagram showing an example of the functional configuration of a mobile terminal 300 according to the present embodiment. Note that only the functional configurations of serializers/deserializers (SERDES (#1), SERDES (#2)) provided in the mobile terminal 300 are shown in FIG. 11, and the description of other structural elements is omitted. Furthermore, the SERDES (#1) and the SERDES (#2) are connected by two coaxial cables.

(Configuration of SERDES (#1))

As shown in FIG. 11, the SERDES (#1) is provided with a signal processing unit 302 (#1), a differential driver 304, common-mode receivers 314 and 316, an adder 318, capacitors C1 and C2, a bypass capacitor C3, and choke coils L1 and L2.

(Configuration of SERDES (#2))

On the other hand, the SERDES (#2) is provided with a differential receiver 306, a signal processing unit 308 (#2), common-mode drivers 310 and 312, capacitors C4 and C5, a bypass capacitor C6, and choke coils L3 and L4.

(Operation)

Data or clocks are differentially transmitted from the SERDES (#1) to the SERDES (#2). First, data or a clock (hereinafter, differential data) S10 is input from the signal processing unit 302 to the differential driver 304, and differential signals are generated. The differential signals have a DC component cut by the capacitor C1, C2, and are superimposed on DC power Vdd whose high-frequency component is cut by the choke coil L1, L2. Then, the differential signals on which the DC power Vdd is superimposed are transmitted to the SERDES (#2) through the coaxial cables.

When transmitted to the SERDES (#2), the differential signals superimposed on the DC power Vdd have the high-frequency cut by the choke coil L3, L4 and have DC power Vdd' separated, and also, have DC components cut by the capacitors C4, C5 and have the differential signals separated. The separated DC power Vdd' is used as driving power for each structural element of the SERDES (#2).

On the other hand, the separated differential signals are input to the differential receiver 306, and the waveform of the differential data S10 is restored. However, the waveform restored by the differential receiver 306 will be a waveform S11 having amplitude twice that of the differential data S10. This waveform S11 is input to the signal processing unit 308, and the original differential data S10 is restored.

On the other hand, data is transmitted in common mode from the SERDES (#2) to the SERDES (#1). First, data (hereinafter, common-mode data) S12 is input from the signal processing unit 308 to the common-mode drivers 310 and 312, and common-mode signals are generated. The common-mode signals have a DC component cut by the capacitor C4, C5, and are superimposed on DC power Vdd supplied from the SERDES (#1) in the transmission line. Then, the common-mode signals on which the DC power Vdd is superimposed are transmitted to the SERDES (#1) through the coaxial cables.

The common-mode signals on which the DC power Vdd is superimposed are input to the common-mode receiver 314, 316 after having the DC component cut by the capacitor C1, C2. Furthermore, the common-mode signals received by the common-mode receivers 314 and 316 are input to and added by the adder 318, and are input to the signal processing unit 302 as a signal S13. Additionally, the signal S13 will have amplitude twice the amplitude of the waveform of the common-mode data S12. The signal processing unit 308 restores the common-mode data based on this signal S13.

By differentially transmitting data from the SERDES (#1) to the SERDES (#2) and transmitting, in common mode, data from the SERDES (#2) to the SERDES (#1) in this manner, a common-mode signal and a differential signal can be easily separated by the subtraction by the differential receiver 306 and the addition by the adder 318 even if they are superimposed in the transmission line. Thus, by combining the common-mode transmission and the differential transmission in the manner described above, full-duplex transmission can be realized.

Additionally, this method is effective in a case of transmitting a clock from the SERDES (#1) and transmitting data synchronized with the clock from the SERDES (#2), or in a case of transmitting high-speed data from the SERDES (#1) and transmitting, at the same time, low-speed data from the SERDES (#2), for example.

3: Summary

Lastly, the technical contents according to the first embodiment of the present invention will be briefly described. The technical contents stated here can be applied to various types of information processing apparatus, such as a PC, a mobile phone, a portable game machine, a portable information terminal, an information appliance, a car navigation system, and the like. It is suitably used particularly for an electronic device for which data transmission through a hinge portion is desired.

The functional configuration of the information processing apparatus described above can be expressed as follows. This information processing apparatus includes first and second modules. Furthermore, the first and second modules are electrically connected by first and second transmission lines.

Also, the first module includes a signal addition unit that generates an addition signal by adding a data signal to a clock, a signal subtraction unit that generates a subtraction signal by subtracting the data signal from the clock, a first signal transmission unit that transmits the addition signal through a first transmission line, and a second signal transmission unit that transmits the subtraction signal through a second transmission line.

Furthermore, the second module includes a data component extraction unit that extracts a component of the data signal by subtracting the subtraction signal received through the second transmission line from the addition signal received through the first transmission line, and a clock component extraction unit that extracts a component of the clock by adding the subtraction signal received through the second transmission line to the addition signal received through the first transmission line.

According to this configuration, a clock can be transmitted in common mode and a data signal can be differentially transmitted. Also, the clock and the data signal can be simultaneously transmitted. Furthermore, since it becomes possible to transmit the clock by using two transmission lines, the amplitude of a clock passing through one transmission line can be reduced to half. As a result, even if a clock of an extremely high frequency is transmitted, the influence of EMI or the like caused due to the clock will be small.

As described, restriction due to the EMI or the like is alleviated, and thus it becomes possible, at the time of transmitting a data signal of high bit rate, to simultaneously transmit a clock having a frequency about ½ of the transmission speed of the data signal. When simultaneous transmission of such high-frequency clock becomes possible, the receiving side can decode the original data from the data signal by using both edges of the clock, and a circuit such as a PLL will not have to be provided to the receiving side. As a result, a circuit such as a PLL is not provided, and the circuit scale and the power consumption can be reduced to that extent.

(Notes)

The serializer/deserializer 112 is an example of the first module. The serializer/deserializer 130 is an example of the second module. The signal processing unit 202 is an example of the signal addition unit and the signal subtraction unit. The common-mode driver 204 is an example of the first signal transmission unit. The common-mode driver 206 is an example of the second signal transmission unit. The differential receiver 210 and the signal processing unit 222 are examples of the data component extraction unit.

The common-mode receivers 212 and 214, the adder 216, and the signal processing unit 222 are examples of the clock component extraction unit. The serializer/deserializer 112 is an example of a power superimposition unit. The serializer/deserializer 130 is an example of a power separation unit. The high-pass filter 218 is an example of a low-cut filter. The signal processing unit 202 is an example of a data encoding unit and a synchronous addition unit.

The differential driver 220 is an example of third and fourth signal transmission units. The differential receiver 208 is an example of a data component extraction unit. The signal processing unit 222 is an example of a data encoding unit. The coaxial cables 120 are an example of the first and second transmission lines. The baseband processor 110 is an example of an arithmetic processing unit. The liquid crystal unit 132 is an example of a display unit. The differential receiver 210 is an example of a first data component extraction unit. The common-mode receivers 212 and 214, and the adder 216 are examples of a second data component extraction unit.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-188574 filed in the Japan Patent Office on Aug. 17, 2009, the entire content of which is hereby incorporated by reference.

What is claimed is:

1. An information processing apparatus comprising:
a first module including:
a signal addition unit to generate an addition signal by adding a data signal to a clock, wherein the addition signal comprises a first component of the data signal having a first phase;
a signal subtraction unit to generate a subtraction signal by subtracting the data signal from the clock, wherein the subtraction signal comprises a second component of the data signal having a second phase that is opposite to the first phase;
a first signal transmission unit to transmit the addition signal through a first transmission line; and
a second signal transmission unit to transmit the subtraction signal through a second transmission line; and
a second module including:
a data component extraction unit to extract a component of the data signal by subtracting the subtraction signal generated by subtracting the data signal from the clock and received through the second transmission line from the addition signal generated by adding the data signal to the clock and received through the first transmission line, and
a clock component extraction unit to extract a component of the clock by adding the subtraction signal generated by subtracting the data signal from the clock and received through the second transmission line to the addition signal generated by adding the data signal to the clock and received through the first transmission line.

2. The information processing apparatus according to claim 1, wherein:
the first module further includes a power superimposition unit to superimpose DC power on the addition signal generated at the signal addition unit and on the subtraction signal generated at the signal subtraction unit,
the first signal transmission unit transmits, through the first transmission line, the addition signal on which the DC power has been superimposed at the power superimposition unit,
the second signal transmission unit transmits, through the second transmission line, the subtraction signal on which the DC power has been superimposed at the power superimposition unit, and
the second module further includes a power separation unit to:
separate the DC power and the addition signal from a signal received through the first transmission line, and
separate the DC power and the subtraction signal from a signal received through the second transmission line.

3. The information processing apparatus according to claim 2, wherein the second module further includes a low-cut filter to remove a low-frequency component from the component of the clock extracted at the clock component extraction unit.

4. The information processing apparatus according to claim 3, wherein the first module further includes a data encoding unit to generate the data signal by encoding data into a code not having a DC component.

5. The information processing apparatus according to claim 1, wherein:
the first module further includes a synchronous addition unit to generate a clock-added signal by synchronously adding the clock to a first data signal,
the signal addition unit generates an addition signal by adding a second data signal to the clock-added signal generated at the synchronous addition unit,
the signal subtraction unit generates a subtraction signal by subtracting the second data signal from the clock-added signal generated at the synchronous addition unit,
the data component extraction unit extracts a component of the second data signal by subtracting the subtraction signal received through the second transmission line from the addition signal received through the first transmission line, and
the clock component extraction unit extracts a component of the clock-added signal by adding the subtraction signal received through the second transmission line to the addition signal received through the first transmission line, and also, extracts a component of the clock based on a polarity inversion cycle of the component of such clock-added signal.

6. The information processing apparatus according to claim 1, wherein the second module further includes:
a third signal transmission unit to transmit a data signal through the first transmission line, and
a fourth signal transmission unit to transmit the data signal through the second transmission line,
wherein, when the data signal is to be transmitted by the third and fourth signal transmission units,
the first signal transmission unit transmits the clock through the first transmission line, and
the second signal transmission unit transmits an inverted signal of the clock through the second transmission line, and
wherein the first module further includes a data component extraction unit to extract a component of the data signal by adding a signal received through the second transmission line to a signal received through the first transmission line.

7. The information processing apparatus according to claim 6, wherein the second module further includes a data encoding unit to generate the data signal by encoding data into a code not having a DC component.

8. The information processing apparatus according to claim 1, wherein:
the signal addition unit adds the data signal to the clock in a digital domain, and
the signal subtraction unit subtracts the data signal from the clock in a digital domain.

9. The information processing apparatus according to claim 1,
wherein the signal addition unit adds the data signal to the clock in an analogue domain, and
wherein the signal subtraction unit subtracts the data signal from the clock in an analogue domain.

10. The information processing apparatus according to claim 1, wherein the first and second transmission lines are formed from two coaxial cables, one 2-core coaxial cable, or one shielded 2-core flexible cable.

11. The information processing apparatus according to claim 1, wherein:
the first module further includes an arithmetic processing unit to output at least display data,
the second module further includes a display unit to display the display data that is input,
the signal addition unit generates an addition signal by adding a data signal of the display data output from the arithmetic processing unit to the clock,
the signal subtraction unit generates a subtraction signal by subtracting the data signal of the display data output from the arithmetic processing unit from the clock, and
the data component extraction unit extracts a component of the data signal of the display data, and inputs the display data regenerated from the component of the data signal to the display unit.

12. An information processing apparatus comprising:
a first module including:
a signal addition unit to generate an addition signal by adding a second data signal to a first data signal, wherein the addition signal comprises a first component of the second data signal having a first phase;
a signal subtraction unit to generate a subtraction signal by subtracting the second data signal from the first data signal, wherein the subtraction signal comprises a second component of the second data signal having a second phase that is opposite to the first phase;
a first signal transmission unit to transmit the addition signal through a first transmission line; and
a second signal transmission unit to transmit the subtraction signal through a second transmission line; and
a second module including:
a first data component extraction unit to extract a component of the first data signal by subtracting the subtraction signal generated by subtracting the second data signal from the first data signal and received through the second transmission line from the addition signal generated by adding the second data signal to the first data signal and received through the first transmission line, and
a second data component extraction unit to extract a component of the second data signal by adding the subtraction signal generated by subtracting the second data signal from the first data signal and received through the second transmission line to the addition signal generated by adding the second data signal to the first data signal and received through the first transmission line.

13. A signal transmission method comprising:
generating an addition signal by adding a data signal to a clock, wherein the addition signal comprises a first component of the data signal having a first phase;
generating a subtraction signal by subtracting the data signal from the clock, wherein the subtraction signal comprises a second component of the data signal having a second phase that is opposite to the first phase;
transmitting the addition signal through a first transmission line;
transmitting the subtraction signal through a second transmission line;
receiving, through the first and second transmission lines, the transmitted addition signal and the transmitted subtraction signal;
extracting a component of the data signal by subtracting the transmitted subtraction signal generated by subtracting the data signal from the clock and received through the second transmission line from the transmitted addition signal generated by adding the data signal to the clock and received through the first transmission line; and
extracting a component of the clock by adding the transmitted subtraction signal generated by subtracting the data signal from the clock and received through the second transmission line to the transmitted addition signal generated by adding the data signal to the clock and received through the first transmission line.

14. A signal transmission method comprising:
generating an addition signal by adding a second data signal to a first data signal, wherein the addition signal comprises a first component of the second data signal having a first phase;
generating a subtraction signal by subtracting the second data signal from the first data signal, wherein the subtraction signal comprises a second component of the second data signal having a second phase that is opposite to the first phase;
transmitting the addition signal through a first transmission line;
transmitting the subtraction signal through a second transmission line;
receiving, through the first and second transmission lines, the transmitted addition signal and the transmitted subtraction;
extracting a component of the first data signal by subtracting the transmitted subtraction signal generated by subtracting the second data signal from the first data signal and received through the second transmission line from the transmitted addition signal generated by adding the second data signal to the first data signal and received through the first transmission line; and
extracting a component of the second data signal by adding the transmitted subtraction signal generated by subtracting the second data signal from the first data signal and received through the second transmission line to the transmitted addition signal generated by adding the second data signal to the first data signal and received through the first transmission line.

15. The information processing apparatus according to claim 12, wherein:
the first module further includes a power superimposition unit to superimpose DC power on the addition signal generated at the signal addition unit and on the subtraction signal generated at the signal subtraction unit, the first signal transmission unit transmits, through the first transmission line, the addition signal on which the DC power has been superimposed at the power superimposition unit, the second signal transmission unit transmits, through the second transmission line, the subtraction signal on which the DC power has been superimposed at the power superimposition unit, and the second module further includes a power separation unit to:

separate the DC power and the addition signal from a signal received through the first transmission line, and separate the DC power and the subtraction signal from a signal received through the second transmission line.

16. The information processing apparatus according to claim 12, wherein the first and second transmission lines are formed from two coaxial cables, one 2-core coaxial cable, or one shielded 2-core flexible cable.

17. The signal transmission method according to claim 13, further comprising:

superimposing DC power on the addition signal and on the subtraction signal;

transmitting, through the first transmission line, the addition signal on which the DC power has been superimposed;

transmitting, through the second transmission line, the subtraction signal on which the DC power has been superimposed;

separating the DC power and the addition signal from a signal received through the first transmission line; and separating the DC power and the subtraction signal from a signal received through the second transmission line.

18. The signal transmission method according to claim 13, further comprising:

applying a low-cut filter to remove a low-frequency component from the component of the clock.

19. The signal transmission method according to claim 14, further comprising:

superimposing DC power on the addition signal and on the subtraction signal;

transmitting, through the first transmission line, the addition signal on which the DC power has been superimposed;

transmitting, through the second transmission line, the subtraction signal on which the DC power has been superimposed;

separating the DC power and the addition signal from a signal received through the first transmission line; and separating the DC power and the subtraction signal from a signal received through the second transmission line.

20. The signal transmission method according to claim 14, further comprising:

applying a low-cut filter to remove a low-frequency component from the component of the second data signal.

21. The information processing apparatus according to claim 1, wherein:

the data component extraction unit extracts the component of the data signal by:

extracting the first and second components of the data signal by subtracting the subtraction signal from the addition signal; and obtaining the component of the data signal from the extracted first and second components.

22. The information processing apparatus according to claim 12, wherein:

the first data component extraction unit extracts the component of the first data signal by:

extracting the first and second components of the second data signal by subtracting the subtraction signal from the addition signal; and obtaining the component of the second data signal from the extracted first and second components.

* * * * *